US00RE42153E

(19) United States
(12) Reissued Patent
Hubbard et al.

(10) Patent Number: US RE42,153 E
(45) Date of Reissued Patent: Feb. 15, 2011

(54) DYNAMIC COORDINATION AND CONTROL OF NETWORK CONNECTED DEVICES FOR LARGE-SCALE NETWORK SITE TESTING AND ASSOCIATED ARCHITECTURES

(76) Inventors: Edward A. Hubbard, 3105 Scarlet Oak CV, Round Rock, TX (US) 78665-8802; Krishnamurthy Venkatramani, 9925 Brightling Ln, Austin, TX (US) 78750-3874; David P. Anderson, Space Sciences Laboratory University of California, Berkeley, Berkeley, CA (US) 94720; Ashok K. Adiga, 10417 Canyon Vista Way, Austin, TX (US) 78726-1920; Greg D. Hewgill, 10 Stenness Ave, Somerfield, Christchurch (NZ), 8024; Jeff A. Lawson, 12601 Oro Valley Tri, Austin, TX (US) 78729-7300

(21) Appl. No.: 12/462,600
(22) Filed: Aug. 6, 2009
(Under 37 CFR 1.47)

Related U.S. Patent Documents

Reissue of:
(64) Patent No.: 7,254,607
Issued: Aug. 7, 2007
Appl. No.: 10/186,266
Filed: Jun. 27, 2002

(63) Continuation-in-part of application No. 09/834,785, filed on Apr. 13, 2001, and a continuation-in-part of application No. (Continued)

(60) Provisional application No. 60/368,871, filed on Mar. 29, 2002.

(51) Int. Cl.
*G06F 15/16* (2006.01)

(52) U.S. Cl. ..... 709/203; 709/201; 709/205; 709/224; 709/226

(58) Field of Classification Search ..... 709/202, 709/203, 224, 226, 201, 205
See application file for complete search history.

(56) References Cited

U.S. PATENT DOCUMENTS 4,669,730 A * 6/1987 Small ..... 273/138
4,699,513 A 10/1987 Brooks et al.

(Continued)

FOREIGN PATENT DOCUMENTS

| | | |
|---|---|---|
| EP | 0883313 | 9/1998 |
| WO | WO-2001014961 | 3/2001 |
| WO | WO-2001073545 | 10/2001 |

OTHER PUBLICATIONS

Brian Hayes, "Computing Science: Collective Wisdon," *American Scientist,* Mar.–Apr. 1998.*

(Continued)

*Primary Examiner*—Michael Won

(57) ABSTRACT

Dynamic coordination and control of network connected devices within a distributed processing platform is disclosed for large-scale network site testing, or for other distributed projects. For network site testing, the distributed processing system utilizes a plurality of client devices which are running a client agent program associated with the distributed computing platform and which are running potentially distinct project modules for the testing of network sites or other projects. The participating client devices can be selected based upon their attributes and can receive test workloads from the distributed processing server systems. In addition, the client devices can send and receive poll communications that may be used during processing of the project to control, manage and coordinate the project activities of the distributed devices. If desired, a separate poll server system can be dedicated to handling the poll communication and coordination and control operations with the participating distributed devices during test operations, thereby allowing other server tasks to be handled by other distributed processing server systems. Once the tests are complete, the results can be communicated from the client devices to the server systems and can be reported, as desired. Additionally, the distributed processing system can identify the attributes, including device capabilities, of distributed devices connected together through a wide variety of communication systems and networks and utilize those attributes to organize, manage and distribute project workloads to the distributed devices.

66 Claims, 9 Drawing Sheets

Related U.S. Patent Documents

(63) 09/794,969, filed on Feb. 27, 2001, now abandoned, and a continuation-in-part of application No. 09/648,832, filed on Aug. 25, 2000, now Pat. No. 6,847,995, and a continuation-in-part of application No. 09/602,983, filed on Jun. 23, 2000, now Pat. No. 6,963,897, and a continuation-in-part of application No. 09/603,740, filed on Jun. 23, 2000, now abandoned, and a continuation-in-part of application No. 09/539,106, filed on Mar. 30, 2000, now Pat. No. 6,891,802, and a continuation-in-part of application No. 09/539,428, filed on Mar. 30, 2000, now abandoned, which is a continuation-in-part of application No. 09/539,448, filed on Mar. 30, 2000, now abandoned.

(56) References Cited

U.S. PATENT DOCUMENTS 4,815,741 A * 3/1989 Small ..... 273/138
4,818,064 A 4/1989 Youngquist et al.
4,839,798 A 6/1989 Eguchi et al.
4,893,075 A 1/1990 Dierker, Jr.
4,987,533 A 1/1991 Clark et al.
5,056,019 A * 10/1991 Schultz et al. ..... 364/405
5,031,089 A 4/1994 Takashima
5,332,218 A * 7/1994 Lucey ..... 273/138
5,402,394 A * 3/1995 Turski ..... 368/10
5,483,444 A * 1/1996 Heintzeman et al. ..... 364/401
5,594,792 A 1/1997 Chouraki et al.
5,598,566 A * 1/1997 Pascucci et al. ..... 395/750
5,655,081 A * 8/1997 Bonnell et al. ..... 395/200.32
5,659,614 A 8/1997 Bailey, III
5,703,949 A * 12/1997 Rosen ..... 380/21
5,740,231 A 4/1998 Cohn et al.
5,740,549 A * 4/1998 Reilly et al. ..... 705/14
5,761,507 A * 6/1998 Govett ..... 718/101
5,768,504 A * 6/1998 Kells et al. ..... 395/187.01
5,768,532 A 6/1998 Megerian
5,790,789 A 8/1998 Suarez
5,793,964 A 8/1998 Rogers et al.
5,802,062 A * 9/1998 Gehani et al. ..... 370/465
5,806,045 A 9/1998 Biorge et al.
5,815,793 A * 9/1998 Ferguson ..... 455/3.1
5,826,261 A 10/1998 Spencer
5,826,265 A * 10/1998 Van Huben et al. ..... 707/8
5,832,411 A 11/1998 Schatzmann et al.
5,842,219 A * 11/1998 High, Jr. et al. ..... 707/103
5,848,415 A 12/1998 Guck
5,862,325 A * 1/1999 Reed et al. ..... 395/200.31
5,881,232 A 3/1999 Cheng et al.
5,884,072 A * 3/1999 Rasmussen ..... 395/600
5,884,320 A 3/1999 Agrawal et al.
5,887,143 A * 3/1999 Saito et al. ..... 395/200
5,893,075 A * 4/1999 Plainfield et al. ..... 705/14
5,893,905 A * 4/1999 Main et al. ..... 705/11
5,907,619 A 5/1999 Davis
5,909,540 A * 6/1999 Carter et al. ..... 395/182.02
5,911,776 A 6/1999 Guck
5,916,024 A * 6/1999 Von Kohorn ..... 463/40
5,918,229 A * 6/1999 Davis et al. ..... 707/10
5,921,865 A * 7/1999 Scagnelli et al. ..... 463/17
5,937,192 A * 8/1999 Martin ..... 395/705
5,953,420 A 9/1999 Matyas, Jr. et al.
5,958,010 A * 9/1999 Agarwal et al. ..... 709/224
5,964,832 A * 10/1999 Kisor ..... 709/202
5,966,451 A * 10/1999 Utsumi ..... 380/49
5,970,469 A * 10/1999 Scroggie et al. ..... 705/14
5,970,477 A * 10/1999 Roden ..... 705/32
5,978,594 A * 11/1999 Bonnell et al. ..... 395/837
5,987,506 A * 11/1999 Carter et al. ..... 709/213
6,003,065 A * 12/1999 Yan et al. ..... 709/201
6,003,083 A * 12/1999 Davies et al. ..... 709/226
6,009,455 A * 12/1999 Doyle ..... 709/201
6,014,634 A * 1/2000 Scroggie et al. ..... 705/14
6,014,712 A 1/2000 Islam et al.
6,024,640 A * 2/2000 Walker et al. ..... 463/17
6,026,474 A * 2/2000 Carter et al. ..... 711/202
6,052,584 A 4/2000 Harvey et al.
6,052,785 A * 4/2000 Lin et al. ..... 713/201
6,058,393 A * 5/2000 Meier et al. ..... 707/10
6,061,660 A * 5/2000 Eggleston et al. ..... 705/14
6,065,046 A 5/2000 Feinberg et al.
6,070,190 A * 5/2000 Reps et al. ..... 709/224
6,076,105 A * 6/2000 Wolff et al. ..... 709/223
6,078,953 A 6/2000 Vaid et al.
6,094,654 A * 7/2000 Van Huben et al. ..... 707/8
6,098,091 A 8/2000 Kisor
6,112,181 A * 8/2000 Shear et al. ..... 705/1
6,112,225 A * 8/2000 Kraft et al. ..... 709/202
6,112,243 A * 8/2000 Downs et al. ..... 709/226
6,112,304 A * 8/2000 Clawson ..... 713/156
6,115,713 A * 9/2000 Pascucci et al. ..... 707/10
6,128,644 A 10/2000 Nozaki
6,131,067 A 10/2000 Girerd et al.
6,134,532 A 10/2000 Lazarus et al.
6,135,646 A 10/2000 Kahn et al.
6,138,155 A 10/2000 Davis et al.
6,148,335 A * 11/2000 Haggard et al. ..... 709/224
6,148,377 A * 11/2000 Carter et al. ..... 711/147
6,151,684 A * 11/2000 Alexander et al. ..... 714/4
6,167,428 A 12/2000 Ellis
6,189,045 B1 2/2001 O'Shea
6,191,847 B1 2/2001 Melendez et al.
6,208,975 B1 3/2001 Bull et al.
6,211,782 B1 4/2001 Sandelman et al.
6,212,550 B1 4/2001 Segur
6,249,836 B1 6/2001 Downs et al.
6,253,193 B1 6/2001 Ginter et al.
6,263,358 B1 * 7/2001 Lee et al. ..... 718/100
6,308,203 B1 10/2001 Itabashi et al.
6,334,126 B1 12/2001 Nagatomo et al.
6,336,124 B1 1/2002 Alam et al.
6,345,240 B1 2/2002 Havens
6,347,340 B1 2/2002 Coelho et al.
6,356,929 B1 3/2002 Gall et al.
6,370,510 B1 4/2002 McGovern et al.
6,370,560 B1 4/2002 Robertazzi et al.
6,374,254 B1 * 4/2002 Cochran et al. ..... 707/102
6,377,975 B1 4/2002 Florman
6,389,421 B1 5/2002 Hawkins et al.
6,393,014 B1 5/2002 Daly et al.
6,415,373 B1 7/2002 Peters et al.
6,418,462 B1 * 7/2002 Xu ..... 709/201
6,421,781 B1 7/2002 Fox et al.
6,434,594 B1 8/2002 Wesemann
6,434,609 B1 8/2002 Humphrey
6,438,553 B1 8/2002 Yamada
6,463,457 B1 * 10/2002 Armentrout et al. ..... 709/201
6,473,805 B2 10/2002 Lewis
6,477,565 B1 11/2002 Daswani et al.
6,499,105 B1 12/2002 Yoshiura et al.
6,505,246 B1 1/2003 Landsman et al.
6,516,338 B1 2/2003 Landsman et al.
6,516,350 B1 2/2003 Lumelsky et al.
6,546,419 B1 4/2003 Humpleman et al.
6,570,870 B1 5/2003 Berstis
6,574,605 B1 * 6/2003 Sanders et al. ..... 705/8
6,574,628 B1 6/2003 Kahn et al.
6,587,866 B1 * 7/2003 Modi et al. ..... 718/105
6,601,101 B1 7/2003 Lee et al.
6,604,122 B1 8/2003 Nilsson
6,615,166 B1 9/2003 Guheen et al.

| | | | | |
|---|---|---|---|---|
| 6,643,291 | B1 | 11/2003 | Yoshihara et al. | |
| 6,643,640 | B1 | 11/2003 | Getchius et al. | |
| 6,654,783 | B1 | 11/2003 | Hubbard | |
| 6,714,976 | B1 * | 3/2004 | Wilson et al. | 709/224 |
| 6,757,730 | B1 | 6/2004 | Berardin | |
| 6,775,699 | B1 * | 8/2004 | DeLuca et al. | 709/224 |
| 6,792,455 | B1 * | 9/2004 | DeLuca et al. | 709/224 |
| 6,847,995 | B1 | 1/2005 | Hubbard et al. | |
| 6,871,223 | B2 * | 3/2005 | Drees | 709/223 |
| 6,891,802 | B1 | 5/2005 | Hubbard | |
| 6,963,897 | B1 | 11/2005 | Hubbard | |
| 7,003,547 | B1 | 2/2006 | Hubbard | |
| 7,020,678 | B1 | 3/2006 | Hubbard | |
| 7,082,474 | B1 | 7/2006 | Hubbard | |
| 7,136,857 | B2 * | 11/2006 | Chen et al. | 1/1 |
| 7,143,089 | B2 | 11/2006 | Petras et al. | |
| 2001/0029613 | A1 | 10/2001 | Fernandez et al. | |
| 2002/0010757 | A1 | 1/2002 | Granik et al. | |
| 2002/0018399 | A1 | 2/2002 | Schulze et al. | |
| 2002/0019584 | A1 | 2/2002 | Schulze et al. | |
| 2002/0019725 | A1 | 2/2002 | Petite | |
| 2002/0065864 | A1 | 5/2002 | Hartsell et al. | |
| 2002/0133593 | A1 | 9/2002 | Johnson et al. | |
| 2002/0188733 | A1 | 12/2002 | Collins | |
| 2002/0194251 | A1 | 12/2002 | Richter | |
| 2002/0198957 | A1 | 12/2002 | Amjadi | |
| 2004/0098449 | A1 | 5/2004 | Bar-Lavi et al. | |
| 2007/0011224 | A1 | 1/2007 | Mena | |
| 2009/0132649 | A1 | 5/2009 | Hubbard | |
| 2009/0138551 | A1 | 5/2009 | Hubbard | |
| 2009/0164533 | A1 | 6/2009 | Hubbard | |
| 2009/0171855 | A1 | 7/2009 | Hubbard | |
| 2009/0216641 | A1 | 8/2009 | Hubbard | |
| 2009/0216649 | A1 | 8/2009 | Hubbard | |
| 2009/0222508 | A1 | 9/2009 | Hubbard | |
| 2010/0036723 | A1 | 2/2010 | Hubbard | |

OTHER PUBLICATIONS

Steve Lawrence, et al., "Accessibility of information on the web," *Nature,* vol. 400, pp. 107–109, Jul. 1999.*

Steve Lawrence, et al., "Searching the World Wide Web," *Science,* vol. 280, pp. 98–100, Apr. 3, 1998.*

Steve Lawrence, et al., "Context and Page Analysis for Improved Web Search," *IEEE Internet Computing,* pp. 38–46, Jul.–Aug. 1998.*

Vasken Bohossian, et al., "Computing in the RAIN: A Reliable Array of Independent Nodes," California Institute of Technology, Sep. 24, 1999.*

"A White Paper: The Economic Impacts of Unacceptable Web–Site Download Speeds," Zona research, Inc., pp. 1–17, Apr. 1999.*

Peter J. Sevcik, "The World–Wide–Wait Status Report," *Northeast Consulting Resources, Inc.,* Global Internet–Performance Conference, Oct. 14, 1999.*

"White Paper: Max, and the Objective Measurement of Web Sites," WebCriteria, Version 1.00, pp. 1–11, Mar. 12, 1999.*

Renu Tewari, et al., "Design Considerations for Distributed Caching on the Internet," pp. 1–13, May 1999.*

"Measuring and Improving Your E–Commerce Web Site Performance with Keynote Perspective," Keynote Systems, pp. 1–15, Mar. 29, 2000.*

Sullivan, et al., "A New Major SETI Project Based On Project Serendip Data and 100,000 Personal Computers," Proc. of the Fifth Intl Conf on Bioastronomy IAU Colloq No. 161, pp. 729–734, 1997.*

Caronni, et al., "How Exhausting is Exhaustive Search?" RSA Laboratories' CryptoBytes, vol. 2, No. 3, pp. 2–6, Jan.–Mar. 1997.*

Bricker, et al., "Condor Technical Summary," Computer Sciences Dept., University of Wisconsin, Version 4.1b, pp. 1–10, Jan. 28, 1992.*

Fields, "Hunting for Wasted Computing Power–New Software for Computing Networks Puts Idle PC's to Work," 1993 Research Sampler, University of Wisconsin, pp. 1–5, 1993.*

Anderson, et al., "SETI@home: Internet Distributed Computing for SETI," A New Era in Bioastronomy, ASP Conference Series, vol. 213, pp. 511–517, 2000.*

Bowyer, et al., "Twenty Years of Serendip, the Berkeley SETI Effort: Past Results and Future Plans," Astronomical and Biochemical Origins and the Search for Life in the Universe, pp. 667–676, 1997.*

Litzkow, et al., "Condor—A Hunter of Idle Workstations," The 8th International Conf. on Distributed Computing Systems, pp. 104–111, 1988.*

Hamidzadeh, et al., "Dynamic Scheduling Techniques for Heterogeneous Computing Systems," Concurrency: Practice and Experience, vol. 7(7), pp. 633–652, 1995.*

Grimshaw, et al., "The Legion Vision of a Worldwide Virtual Computer," Communications of the ACM, vol. 40, No. 1, pp. 39–45, 1997.*

Catlett, et al., "Metacomputing," Communications of the ACM, vol. 35, No. 6, pp. 44–52, 1992.*

Foster, et al., "Globus: A Metacomputing Infrastructure Toolkit," The International Journal of Supercomputer Applications and High Performance Computing, vol. 11, No. 2, pp. 115–128, 1997.*

Mutka, et al., "The Available Capacity of a Privately Owned Workstation Environment," Performance Evaluation 12 (1991) pp. 269–284.*

Sullivan, et al., "A New Major SETI Projet Based on Project Serendip Data and 100,000 Personal Computers," Astronomical and Biochemical Origins and the Search for Life in the Universe, 5th International Conference on Bioastronomy, IAU Colloquium No. 161, pp. 729–734, 1996.*

Gelernter, "Domesticating Parallelism," IEEE Computer, Aug. 1986, 19(8), pp. 12–16.*

Goldberg, et al., "A Secure Environment for Untrusted Helper Applications–Confining the Wily Hacker," 6th USENIX Security Symposium, pp. 1–13, 1996.* distributed.net: The fastest computer on Earth: Feb. 8, 1999, http://web.archive.org/web/19990221230053/http://distributed.*

London et al., "Popcorn—A Paradigm for Global–Computing", Thesis University Jerusalem, Jun. 1998.*

Takagi H. et al., "Ninflet: a migratable parallel objects framework using Java", Java for High–Performance Network Computing, Syracuse, NY, USA, Feb. 1998, vol. 10, No. 11–13, pp. 1063–1078.*

Waldspurger, C.A. et al., "Spawn: a distributed computational economy" IEEE Transactions on Software Engineering, IEEE Inc., NY, US, Feb. 1992, vol. 18, No. 2, pp. 103–117.*

Neary, M. O., et al., "Javelin: Parallel computing on the internet" Future Generations Computer Systems, Elsevier Science Publishers, Amsterdam, NL, Oct. 1999, vol. 15, No. 5–6, pp. 661–664.*

Foster, Ian et al., "The Physiology of the Grid," This is a Draft document and continues to be revised. Version Feb. 17, 2002.*

Douceur, John R. et al., "A Large–Scale Study of File–System Contents," Microsoft Research, Redmond, WA 98052, May 1999.*

Bolosky, William J. et al., "Feasibility of a Serverless Distributed File System Deployed on an Existing Set of Desktop PCs," Microsoft Research, Redmond, WA 98052, Jun. 2000.*

Regev, Ori; Economic Oriented CPU Sharing System for the Internet; Master of Science in Computer Science thesis; Institute of Computer Science; The Hebrew University of Jerusalem; Jul. 1998.*

May, Michael; Idle Computing Resources as Micro–Currencies—Bartering CPU Time for Online Content; AACE WebNet99; Oct. 25–30, 1999.*

May, Michael; Distributed RC5 Decryption as a Consumer for Idle—Time Brokerage; DCW99 Workshop on Distributed Computer on the Web; Jun. 21–23, 1999.*

May, Michael; Locust—A Brokerage System for Accessing Idle Resources for Web–Computing; Proceedings of the 25$^{th}$ Euromicro Conference; vol. 2, pp. 466–473; Sep. 8–10, 1999.*

Huberman, Bernardo A., et al.; Distributed Computation as an Economic System; Journal of Economic Perspectives; vol. 9, No. 1; pp. 141–152; Winter 1995.*

Hayes, Brian "Computing Science: Collective Wisdom", *Retrieved from*: <http://www.americanscientist.org/issues/id.3341,y.0,no.,content.true,page.1,css.print/issue.asp>on Dec. 3, 2009, American Scientist, (Mar. 1998), 3 pages.

Lawrence, Steve et al., "Accessibility of Information on the Web", *Nature*, vol. 400, (Jul. 1999), pp. 107–109.

Lawrence, Steve et al., "Searching the World Wide Web", *Science*, vol. 280, Available at <www.sciencemag.org>, (Apr. 3, 1998), pp. 98–100.

Lawrence, Steve "Context and Page Analysis for Improved Web Search", *IEEE Internet Computing*, vol. 2, No. 4, Available at <http://www.neci.nj.nec.com/homepages/lawrence/papers/search–ic98/>, (Jul. 1998), 11 pages.

Vasken, Bohossian et al., "Computing in the Rain: A reliable array of independent nodes", *California Institute of Technology,* (Sep. 24, 1999).

"A White Paper: The economic impacts of Unacceptable Web–Site Download Speeds", *Research Inc*.,(Apr. 1999) 1–17.

Sevcik, Peter J., "The world Wide Wait Status Report", *Northeast consulting resources, Inc.; Global Internet Performance Conference,* (Oct. 14, 1999).

Henry, Shannon "Putting Idle computers to Work", *The Washington Post,* (Jun. 15, 2000), 3 pages.

Shmulik, London "POPCORN–A Paradigm for Global–Computing", *Master of Computer Science thesis,* supervised by Prof. Noam Nisan, Institute of Computer Science, The Hebrew University of Jerusalem, (Jun. 1998), 94 pages.

"GIMPS Finds First Million–Digit Prime, Stakes Claim To $50,000 EFF Award", (Jun. 1999), 3 pages.

"Final Office Action", U.S. Appl. No. 10/68,210, (May 26, 2009), 12 pages.

"Notice of Allowance", U.S. Appl. No. 09/834785, (Jul. 15, 2009), 4 pages.

"Non–Final Office Action", U.S. Appl. No. 10/687,210, (Nov. 25, 2009), 20 pages.

"Non–final Office Action", U.S. Appl. No. 09/834,785, (Dec. 28, 2009), 8 pages.

"Final Office Action", U.S. Appl. No. 09/834,785, (Jun. 24, 2010), 9 pages.

"Non Final Office Action", U.S. Appl. No. 10/687,210, (Jun. 24, 2010), 21 pages.

"Advisory Action", U.S. Appl. No. 09/834,785, (Sep. 21, 2010), 3 pages.

* cited by examiner

DYNAMIC COORDINATION AND CONTROL OF NETWORK CONNECTED DEVICES FOR LARGE-SCALE NETWORK SITE TESTING AND ASSOCIATED ARCHITECTURES

Matter enclosed in heavy brackets [ ] appears in the original patent but forms no part of this reissue specification; matter printed in italics indicates the additions made by reissue.

This application is a continuation-in-part application of the following applications: application Ser. No. 09/539,448 entitled "CAPABILITY-BASED DISTRIBUTED PARALLEL PROCESSING SYSTEM AND ASSOCIATED METHOD," now abandoned application Ser. No. 09/539,428 entitled "METHOD OF MANAGING DISTRIBUTED WORKLOADS AND ASSOCIATED SYSTEM," and application Ser. No. 09/539,106 entitled "NETWORK SITE TESTING METHOD AND ASSOCIATED SYSTEM," which was filed on Mar. 30, 2000, now U.S. Pat. No. 6,891,802 and which is hereby incorporated by reference in its entirety. This application is also a continuation-in-part application of the following application: application Ser. No. 09/603,740 entitled "METHOD OF MANAGING WORKLOADS AND ASSOCIATED DISTRIBUTED PROCESSING SYSTEM," now abandoned and application Ser. No. 09/602,983 entitled "CUSTOMER SERVICES AND ADVERTISING BASED UPON DEVICE ATTRIBUTES AND ASSOCIATED DISTRIBUTED PROCESSING SYSTEM," now U.S. Pat. No. 6,963,897 each of which was filed on Jun. 23, 2000, and each of which is hereby incorporated by reference in its entirety. This application is also a continuation-in-part application of the following application: application Ser. No. 09/648,832 entitled "SECURITY ARCHITECTURE FOR DISTRIBUTED PROCESSING SYSTEMS AND ASSOCIATED METHOD," which was filed on Aug. 25, 2000, now U.S. Pat. No. 6,847,995 and which is hereby incorporated by reference in its entirety. This application is also a continuation-in-part application of the following co-pending application: application Ser. No. 09/794,969 entitled "SYSTEM AND METHOD FOR MONITIZING NETWORK CONNECTED USER BASES UTILIZING DISTRIBUTED PROCESSING SYSTEMS," which was filed on Feb. 27, 2001, and which is hereby incorporated by reference in its entirety. This application is also a continuation-in-part application of the following co-pending application: application Ser. No. 09/834,785 entitled "SOFTWARE-BASED NETWORK ATTACHED STORAGE SERVICES HOSTED ON MASSIVELY DISTRIBUTED PARALLEL COMPUTING NETWORKS," which was filed on Apr. 13, 2001, and which is hereby incorporated by reference in its entirety. The present application also claims priority to the following co-pending U.S. provisional patent application: Provisional Application Ser. No. 60/368,871 that is entitled "MASSIVELY DISTRIBUTED PROCESSING SYSTEM ARCHITECTURE, SCHEDULING, UNIQUE DEVICE IDENTIFICATION AND ASSOCIATED METHODS," which was filed Mar. 29, 2002, and which is hereby incorporated by reference in its entirety.

TECHNICAL FIELD OF THE INVENTION

This invention relates to distributing project workloads among a multitude of distributed devices and more particularly to techniques and related methods for managing, facilitating and implementing distributed processing in a network environment. This invention is also related to functional, quality of server (QoS), and other testing of network sites utilizing a distributed processing platform.

BACKGROUND

Network site testing is typically desired to determine how a site or connected service performs under a desired set of test circumstances. Several common tests that are often attempted are site load testing and quality of service (QoS) testing. Quality of service (QoS) testing refers to testing a user's experience accessing a network site under normal or various other usability situations. Load testing refers to testing the load a particular network site's infrastructure can handle in user interactions. An extreme version of load testing is a denial-of-service attack, where a system or group of systems intentionally attempt to overload and shut-down a network site. Co-pending Application Ser No. 09/539,106 entitled "NETWORK SITE TESTING METHOD AND ASSOCIATED SYSTEM," (which is commonly owned by United Devices, Inc.) discloses a distributed processing system capable of utilizing a plurality of distributed client devices to test network web sites, for example, with actual expected user systems. One problem associated with network site testing is the management, control and coordination of the distributed devices participating in the network site testing project.

SUMMARY OF THE INVENTION

The present invention provides architectures and methods for the dynamic coordination and control of network connected devices for network site testing and other distributed computing projects. For the network site testing, the distributed processing system utilizes a plurality of client devices that run client agent programs which are associated with a distributed computing platform and which are running one or more possibly distinct project modules for network site testing or other projects. The participating client devices receive project workloads unit from the distributed processing server systems. Poll communications between the client systems and the server systems are used during processing of the distributed project to control, manage and coordinate the activities of the distributed devices in accomplishing the project goal, such as network site testing. If desired, a separate poll server system can be dedicated to handle the poll communications and coordination and control operations with the participating distributed devices during test operation, thereby allowing other server tasks to be handled by other distributed processing server systems. Once the tests are complete, the results can be communicated from the client devices to the server systems and can be reported, as desired. Additionally, the distributed processing system can identify the attributes of distributed devices connected together through a wide variety of communication systems and networks and utilize those attributes to organize, manage and distribute project workloads to the distributed devices.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

The present invention provides a dynamic coordination and control architecture for network site testing within a distributed processing platform that utilizes a plurality of network-connected client devices. The client systems are configured to run a client agent program and project modules for the testing of network sites or other distributed project activities. In addition to project work units, these client devices can receive poll communications that are used during project operations to control, manage and coordinate the project activities of the distributed devices. In addition, if desired, a separate poll server system can be dedicated to handling the poll communications and coordination and control operations with the participating distributed devices during test operation, thereby allowing other server tasks to be handled by other distributed processing server systems. Once the tests are complete, the results can be collected and reported.

Figure 4A:
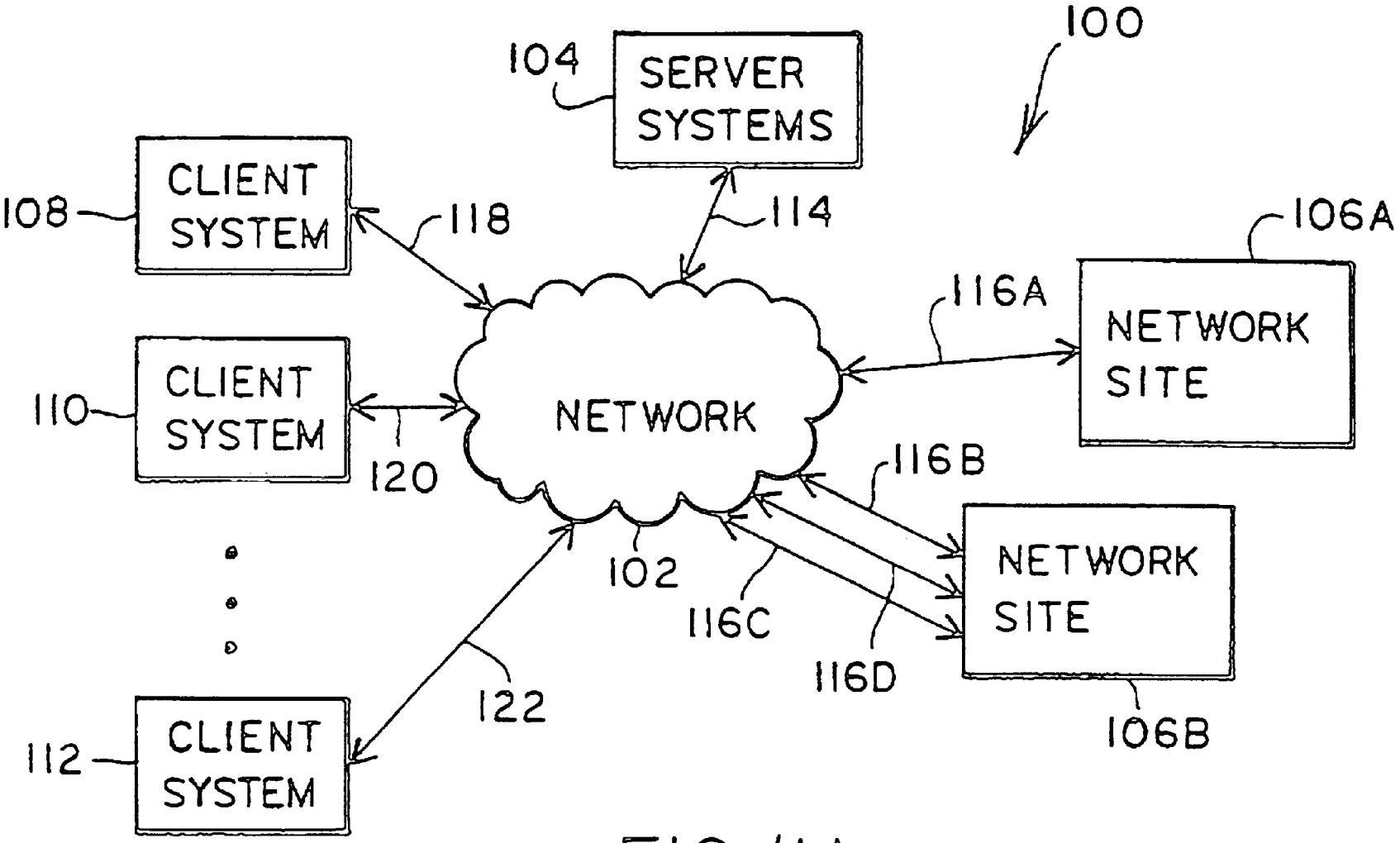
FIG. 4A is a block diagram for a distributed processing system, according to the present invention, including example network sites on which site testing is to be conducted, such as load testing and/or quality-of-service (QoS) testing.
Figure 4B:
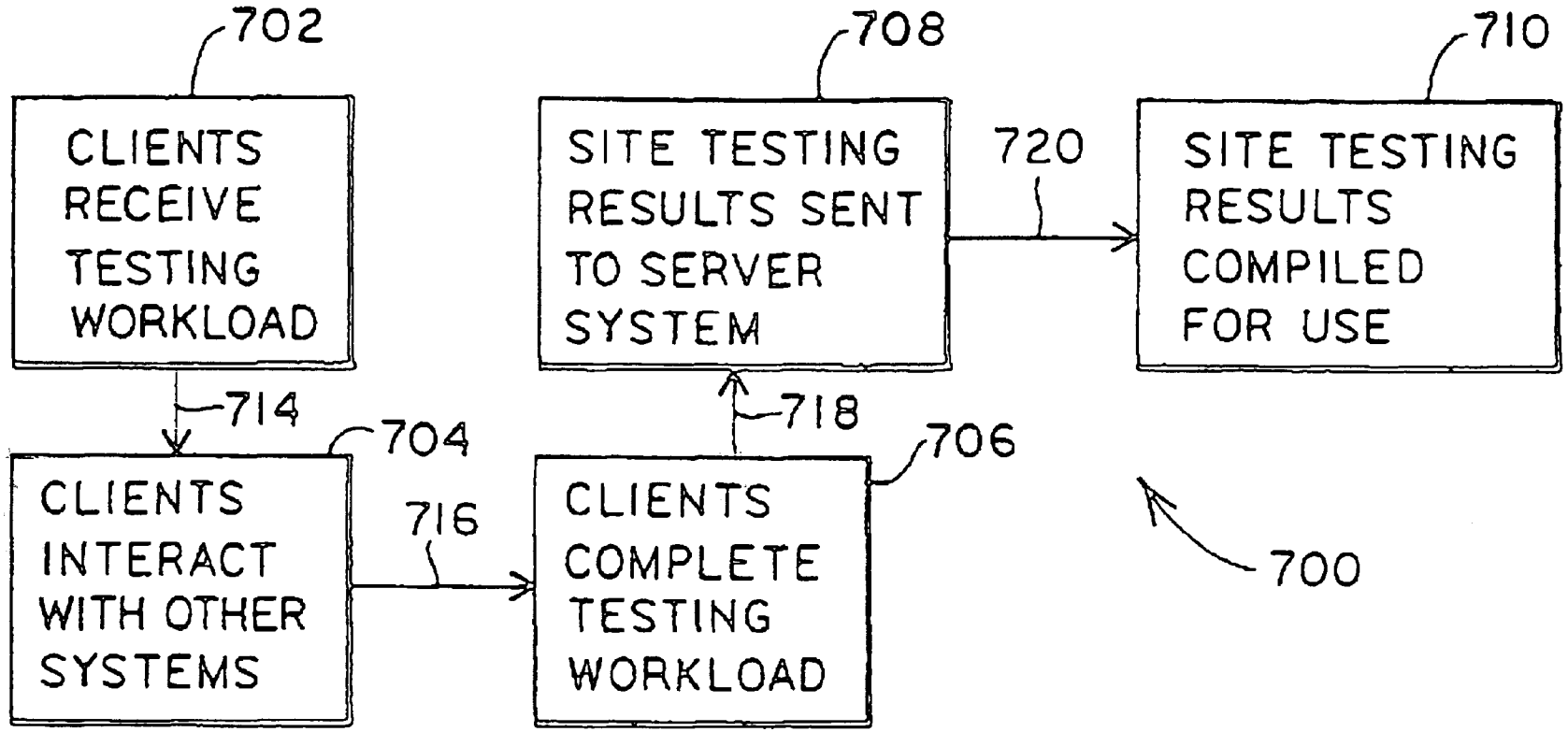
FIG. 4B is a functional block diagram for site-testing, according to the present invention.
Figure 5A:
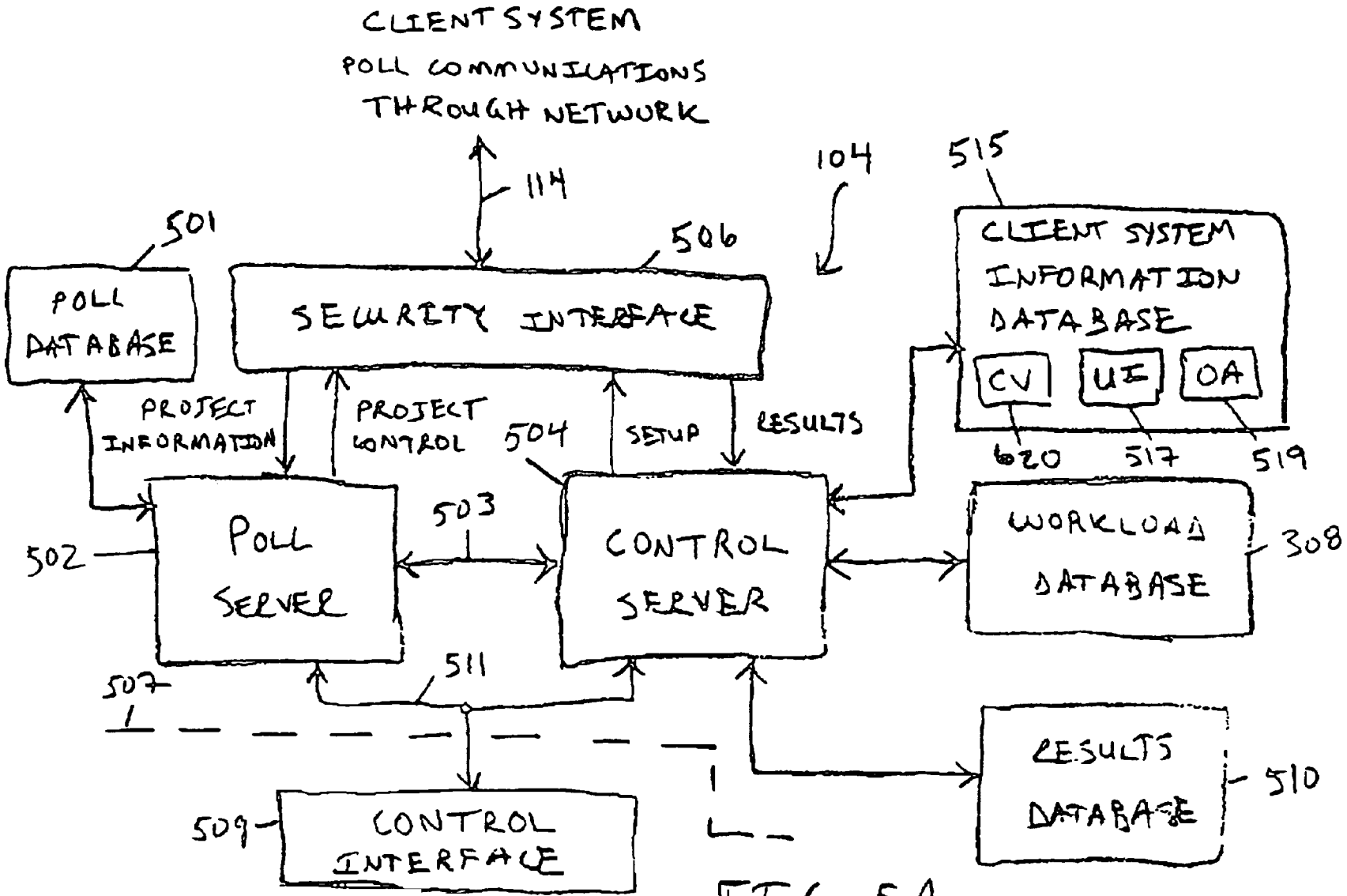
FIG. 5A is a block diagram for a dynamic coordination and control architecture for network site testing, according to the present invention.
Figure 5B:
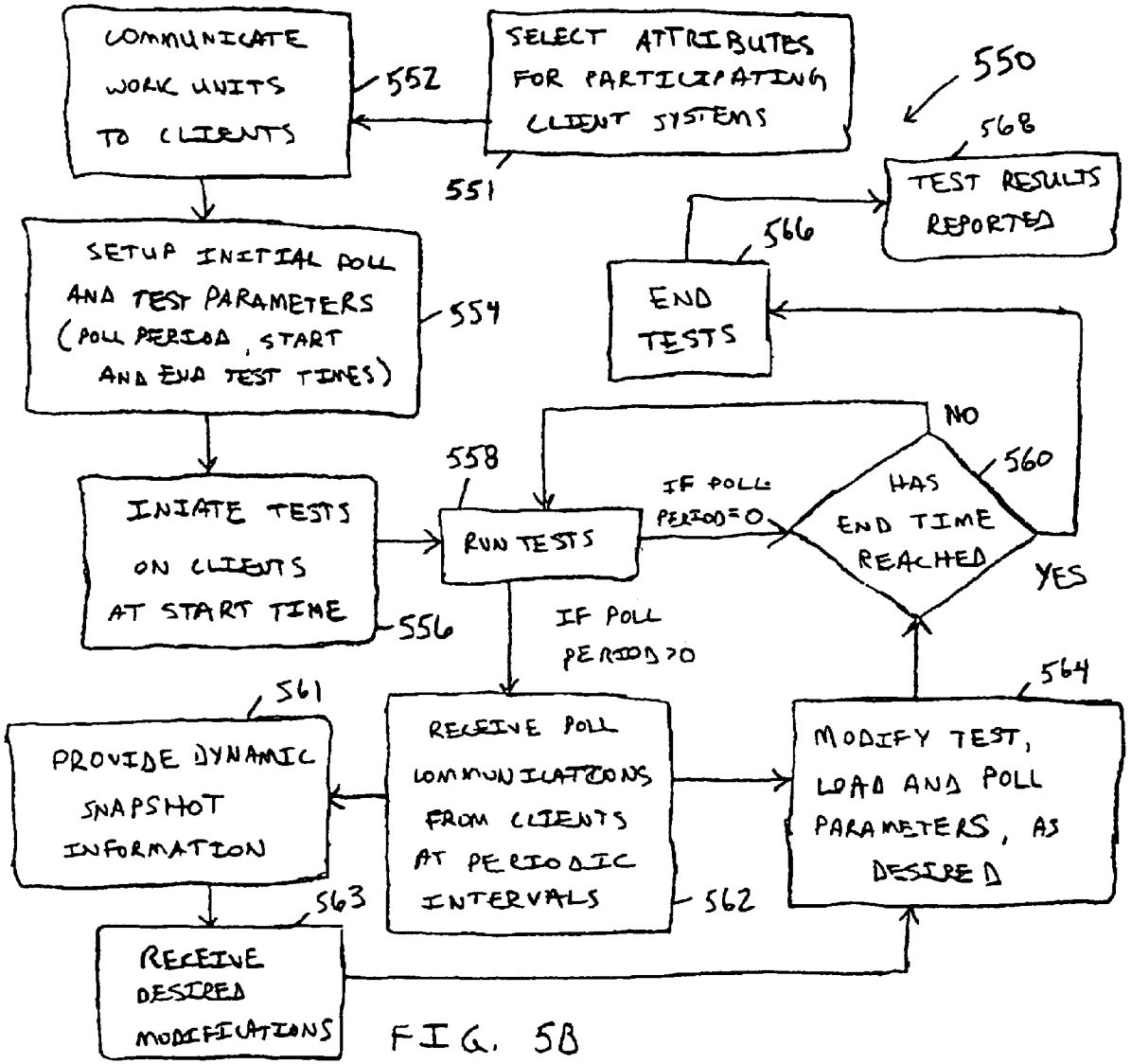
FIG. 5B is a flow diagram for dynamic coordination and control processing that can be utilized as part of network site testing, according to the present invention.

Example embodiments for the coordination and control architecture of the present invention, including a poll server, are described with respect to FIGS. 5A and 5B. First, however, with respect to FIGS. 1A, 1B, 1C, 2A, 2B, 3A, 3B, 4A and 4B example distributed computing environments, network site testing and attribute or capability based device selection are described. Such distributed computing environments utilizing network-connected computing devices are described in more detail in co-pending applications identified and incorporated by reference above.

As described in the co-pending applications, distributed processing systems according to the present invention may identify the capabilities of distributed devices connected together through a wide variety of communication systems and networks and then utilize these capabilities to accomplish network site testing objectives of the present invention. For example, distributed devices connected to each other through the Internet, an intranet network, a wireless network, home networks, or any other network may provide any of a number of useful capabilities to third parties once their respective capabilities are identified, organized, and managed for a desired task. These distributed devices may be connected personal computer systems (PCs), internet appliances, notebook computers, servers, storage devices, network attached storage (NAS) devices, wireless devices, hand-held devices, or any other computing device that has useful capabilities and is connected to a network in any manner. The present invention further contemplates providing an incentive, which may be based in part upon capabilities of the distributed devices, to encourage users and owners of the distributed devices to allow the capabilities of the distributed devices to be utilized in the distributed parallel processing system of the present invention.

The number of usable distributed devices contemplated by the present invention is preferably very large. Unlike a small local network environment, for example, which may include less than 100 interconnected computers systems, the present invention preferably utilizes a multitude of widely distributed devices to provide a massively distributed processing system. With respect to the present invention, a multitude of distributed devices refers to greater than 1,000 different distributed devices. With respect to the present invention, widely distributed devices refers to a group of interconnected devices of which at least two are physically located at least 100 miles apart. With respect to the present invention, a massively distributed processing system is one that utilizes a multitude of widely distributed devices. The Internet is an example of a interconnected system that includes a multitude of widely distributed devices. An intranet system at a large corporation is an example of an interconnected system that includes multitude of distributed devices, and if multiple corporate sites are involved, may include a multitude of widely distributed devices. A distributed processing system according to the present invention that utilizes such a multitude of widely distributed devices, as are available on the Internet or in a large corporate intranet, is a massively distributed processing system according to the present invention.

Figure 1A:
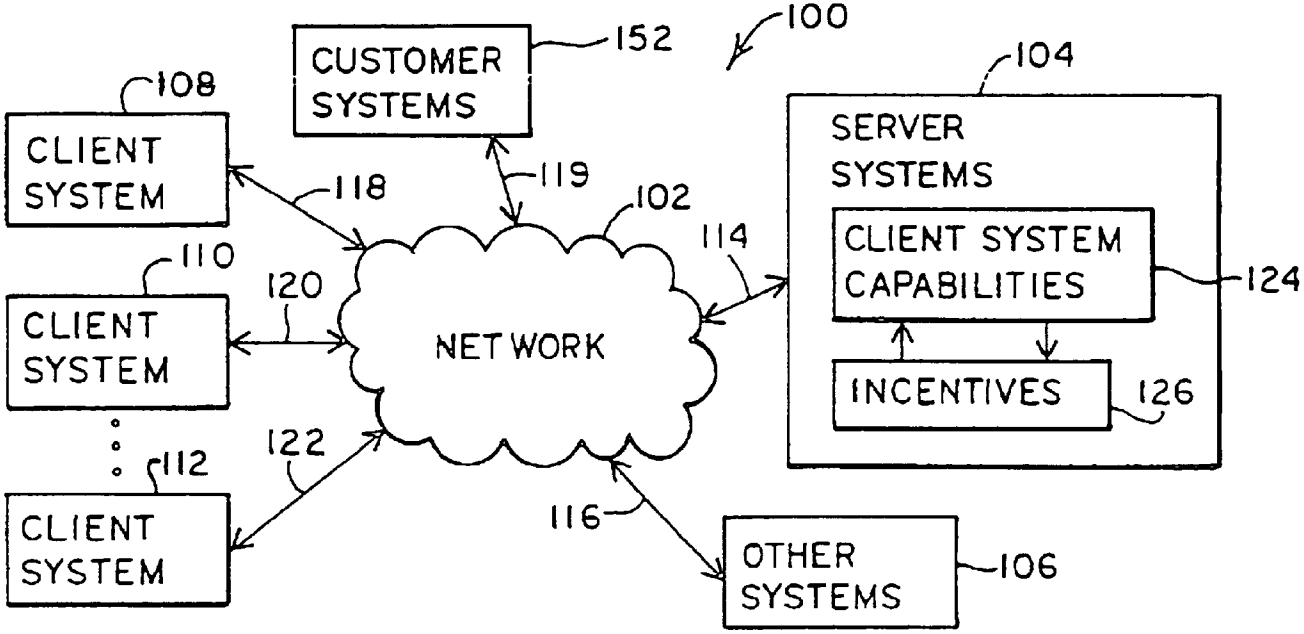
FIG. 1A is a block diagram for a distributed processing system having client capability and incentive features, according to the present invention.

Looking now to FIG. 1A, block diagram is depicted for a distributed parallel processing system 100 according to the present invention. The network 102 is shown having a cloud outline to indicate the unlimited and widely varying nature of the network and of attached client types. For example, the network 102 may be the Internet, an internal company intranet, a local area network (LAN), a wide area network (WAN), a wireless network, a home network or any other system that connects together multiple systems and devices. In addition, network 102 may include any of these types of connectivity systems by themselves or in combination, for example, computer systems on a company intranet connected to computer systems on the Internet.

FIG. 1A also shows client systems 108, 110 . . . 112 connected to the network 102 through communication links 118, 120 . . . 122, respectively. In addition, server systems 104, other systems 106, and customer systems 152 are connected to the network 102 through communication links 114, 116 and 119, respectively. The client system capabilities block 124 is a subset of the server systems 104 and represents a determination of the capabilities of the client systems 108, 110 . . . 112. These client system capabilities, which may be stored in a capabilities database as part of the server systems 104, may be used by the server systems 104 to schedule project workloads, such as a database workload as further discussed below, for the client systems 108, 110 . . . 112. The incentives block 126 is also a subset of the server systems 104 and represents an incentive provided to the users or owners of the clients systems 108, 110 . . . 112 for allowing capabilities of the clients systems 108, 110 . . . 112 to be utilized by the distributed processing system 100. These client system incentives, which may be stored in an incentives database as part of the server systems 104, may be used by the server systems 104 to encourage client systems to be utilized for objectives of the distributed processing system.

It is noted that the client systems 108, 110 and 112 represent any number of systems and/or devices that may be identified, organized and utilized by the server systems 104 to accomplish a desired task, for example, personal computer systems (PCs), internet appliances, notebook computers, servers, storage devices, network attached storage (NAS) devices, wireless devices, hand-held devices, or any other computing device that has useful capabilities and is connected to a network in any manner. The server systems 104 represent any number of processing systems that provide the function of identifying, organizing and utilizing the client systems to achieve the desired tasks.

The incentives provided by the incentives block 126 may be any desired incentive. For example, the incentive may be a sweepstakes in which entries are given to client systems 108, 110 . . . 112 that are signed up to be utilized by the distributed processing system 100. Other example incentives are reward systems, such as airline frequent-flyer miles, purchase credits and vouchers, payments of money, monetary prizes, property prizes, free trips, time-share rentals, cruises, connectivity services, free or reduced cost Internet access, domain name hosting, mail accounts, participation in significant research projects, achievement of personal goals, or any other desired incentive or reward.

As indicated above, any number of other systems may also be connected to the network 102. The element 106, therefore, represents any number of a variety of other systems that may be connected to the network 102. The other systems 106 may include ISPs, web servers, university computer systems, and any other distributed device connected to the network 102, for example, personal computer systems (PCs), internet appliances, notebook computers, servers, storage devices, network attached storage (NAS) devices, wireless devices, hand-held devices, or any other connected computing device that has useful capabilities and is connected to a network in any manner. The customer systems 152 represents customers that have projects for the distributed processing system, as further described with respect to FIG. 1B. The customer systems 152 connect to the network 102 through the communication link 119.

It is noted that the communication links 114, 116, 118, 119, 120 and 122 may allow for communication to occur, if desired, between any of the systems connected to the network 102. For example, client systems 108, 110 . . . 112 may communicate directly with each other in peer-to-peer type communications. It is further noted that the communication links 114, 116, 118, 119, 120 and 122 may be any desired technique for connecting into any portion of the network 102, such as, Ethernet connections, wireless connections, ISDN connections, DSL connections, modem dial-up connections, cable modem connections, fiber optic connections, direct T1 or T3 connections, routers, portal computers, as well as any other network or communication connection. It is also noted that there are any number of possible configurations for the connections for network 102, according to the present invention. The client system 108 may be, for example, an individual personal computer located in someone's home and may be connected to the Internet through an Internet Service Provider (ISP). Client system 108 may also be a personal computer located on an employee's desk at a company that is connected to an intranet through a network router and then connected to the Internet through a second router or portal computer. Client system 108 may further be personal computers connected to a company's intranet, and the server systems 104 may also be connected to that same intranet. In short, a wide variety of network environments are contemplated by the present invention on which a large number of potential client systems are connected.

Figure 1B:
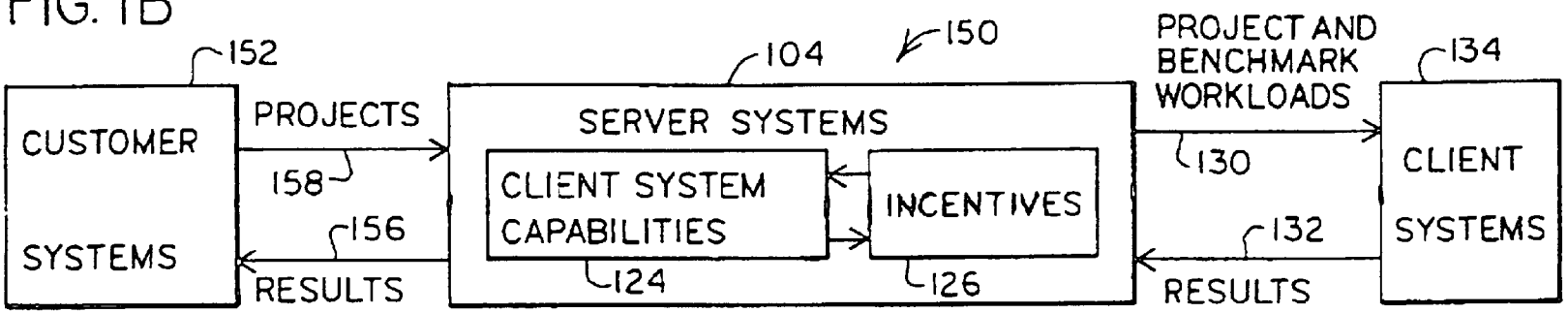
FIG. 1B is a block diagram for information flow among customer systems, server systems and client systems, according to the present invention.

FIG. 1B is a block diagram for an information flow 150 among customer systems 152, server systems 104 and client system 134, for an example distributed processing system environment. The server systems 104, as discussed above, may include any number of different subsystems or components, as desired, including client system capabilities block 124 and incentives block 126. The server systems 104 send project and benchmark workloads 130 to client systems 134. A benchmark workload refers to a standard workload that may be used to determine the relative capabilities of the client systems 134. A project workload refers to a workload for a given project that is desired to be completed. Client systems 134, as discussed above, may be any number of different systems that are connected to the server systems 104 through a network 102, such as client systems 108, 110 . . . 112 in FIG. 1A. The client systems 134 send results 132 back to the server systems 104 after the client systems 134 complete processing any given workload. Depending upon the workload project, the server systems 104 may then provide results 156 to customer systems 152. The customer systems 152 may be, for example, an entity that desires a given project to be undertaken, and if so, provides the project details and data 158 to the server systems 104.

It is noted, therefore, that the capabilities for client systems 108, 110 . . . 112 may span the entire range of possible computing, processing, storage and other sub-systems or devices that are connected to a system connected to the network 102. For example, these subsystems or devices may include: central processing units (CPUs), digital signal processors (DSPs), graphics processing engines (GPEs), hard drives (HDs), memory (MEM), audio sub-systems (ASs), communications subsystems (CSs), removable media types (RMs), and other accessories with potentially useful unused capabilities (OAs). In short, for any given computer system connected to a network 102, there exists a variety of capabilities that may be utilized by that system to accomplish its direct tasks. At any given time, however, only a fraction of these capabilities are typically used on the client systems 108, 110 . . . 112.

As indicated above, to encourage owners or users of client systems to allow their system capabilities to be utilized by control system 104, an incentive system may be utilized. This incentive system may be designed as desired. Incentives may be provided to the user or owner of the clients systems when the client system is signed-up to participate in the distributed processing system, when the client system completes a workload for the distributed processing system, or any other time during the process. In addition, incentives may be based upon the capabilities of the client systems, based upon a benchmark workload that provides a standardized assessment of the capabilities of the client systems, or based upon any other desired criteria.

Security subsystems and interfaces may also be included to provide for secure interactions between the various devices and systems of the distributed processing system 100. The security subsystems and interfaces operate to secure the communications and operations of the distributed processing system. This security subsystem and interface also represents a variety of potential security architectures, techniques and features that may be utilized. This security may provide, for example, authentication of devices when they send and receive transmissions, so that a sending device verifies the authenticity of the receiving device and/or the receiving device verifies the authenticity of the sending device. In addition, this security may provide for encryption of transmissions between the devices and systems of the distributed processing system. The security subsystems and interfaces may also be implemented in a variety of ways, including utilizing security subsystems within each device or security measures shared among multiple devices, so that security is provided for all interactions of the devices within the distributed processing system. In this way, for example, security measures may be set in place to make sure that no unauthorized entry is made into the programming or operations of any portion of the distributed processing system including the client agents.

Figure 1C:
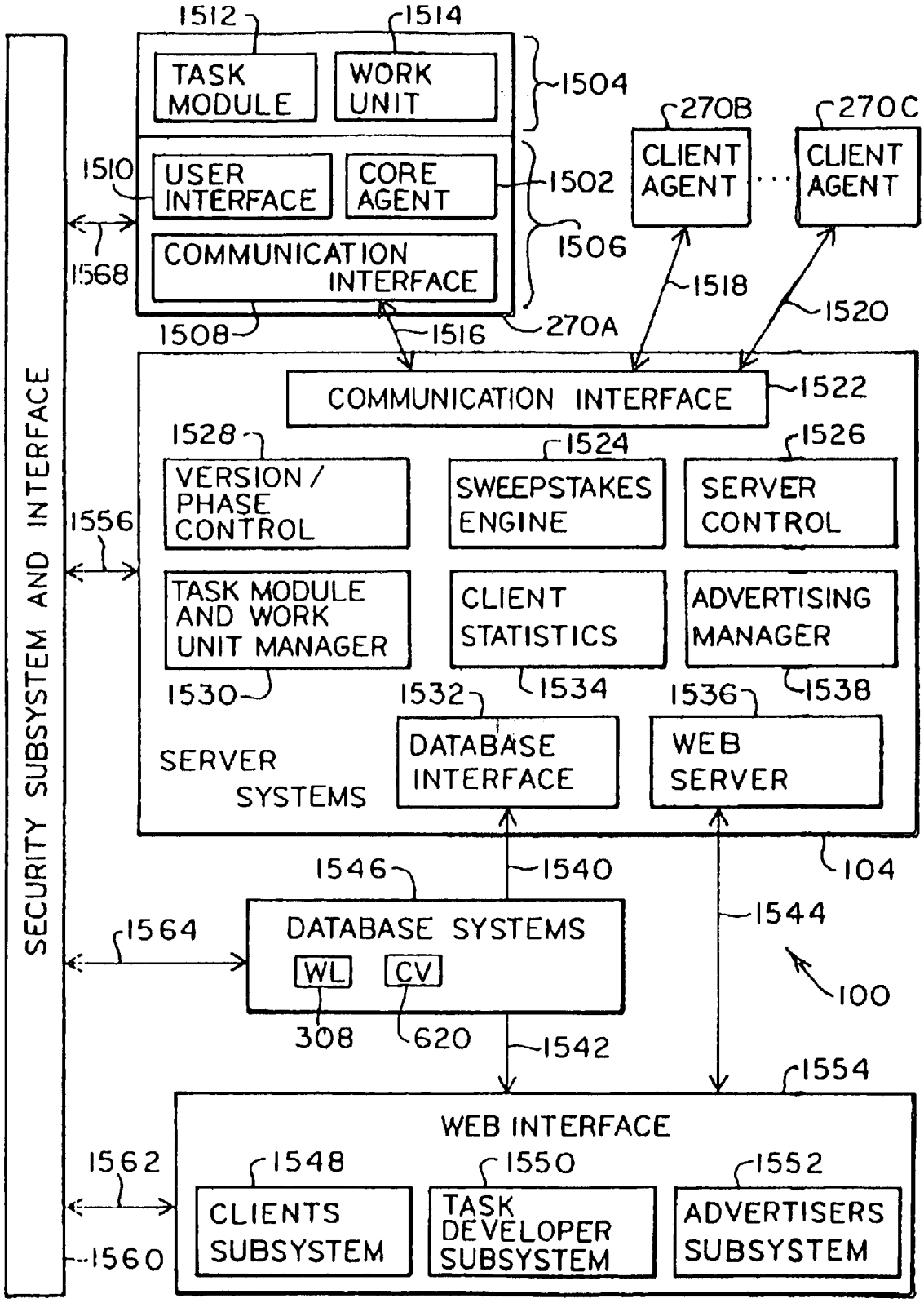
FIG. 1C is a block diagram of an alternative representation for a distributed processing system, according to the present invention.

FIG. 1C is a block diagram of an alternative representation for a distributed processing system 100, according to the present invention. Server systems 104, database systems 1546 and web interface 1554 are coupled together through communication links 1540, 1542 and 1544. The web interface 1554 includes clients subsystem 1548, task developer subsystem 1550, and advertisers subsystem 1552, and may include other subsystems as desired. The database systems 1546 include workload (WL) information 308, client capability vector information 620, and any other stored information as desired. Server systems include various modules and subsystems, including database interface 1532, web server 1536, task module and work unit manager 1530, client statistics module 1534, advertising manager 1538, task module version/phase control subsystem 1528, sweepstakes engine 1524, server control subsystem 1526, and communication interface 1522. It is noted that in the embodiment of a distributed processing system 100 as depicted in FIG. 1C, the three primary operations for the server systems 104, database systems 1546 and web interface 1554 are directed to managing, processing and providing an interface for client systems, customer tasks, and customer advertising.

As discussed above, each client system includes a client agent that operates on the client system and manages the workloads and processes of the distributed processing system. As shown in FIG. 1C, each of the client agents 270A, 270B . . . 270C communicates with the server systems 104 through communication links 1516, 1518 . . . 1520, respectively. As discussed above, any number of different techniques and architectures may be utilized to provide these communication links. In the embodiment as shown in FIG. 1C with respect to client agent 270A, each client agent includes a base distributed processing system component 1506 and a separate project or workload component 1504. As depicted, a communication interface 1508, a core agent module 1502, and a user interface 1510 make up the base distributed processing system component 1506. The task module 1512 and the work unit 1514 make up the separate project or workload component 1504. The task module 1512 operates on top of the core agent module 1502 to provide processing of each project work unit 1514. It is noted that different or additional modules, subsystems or components may be included within the client agent, as desired. For example, a personal computer screen saver component may be part of the base distributed processing system component 1506 or the separate project or workload component 1504.

Also as discussed above, security subsystems and interfaces may be included to provide for secure interactions between the various devices and systems of the distributed processing system 100. As depicted in FIG. 1C, a security subsystem and interface 1560 is interconnected with the server systems 104, the database systems 1546, the web interface 1554, and the client agents 270A, 270B . . . 270C. These interconnections are represented by lines 1566, 1564, 1562, and 1568, respectively. The security subsystem and interface 1560 operates to secure the communications and operations of the distributed processing system. This security subsystem and interface 1560 also represents a variety of potential security architectures, techniques and features that may be utilized. This security may provide, for example, authentication of devices when they send and receive transmissions, so that a sending device verifies the authenticity of the receiving device and/or the receiving device verifies the authenticity of the sending device. In addition, this security may provide for encryption of transmissions between the devices and systems of the distributed processing system. The security subsystem and interface 1560 may also be implemented in a variety of ways, including utilizing security subsystems within each device or security measures shared among multiple devices, so that security is provided for all interactions of the devices within the distributed processing system. In this way, for example, security measures may be set in place to make sure that no unauthorized entry is made into the programming or operations of any portion of the distributed processing system including the client agents 270A, 270B . . . 270C.

In operation, client systems or end-users may utilize the clients subsystem 1548 within the web interface 1554 to register, set user preferences, check statistics, check sweepstakes entries, or accomplish any other user interface option made available, as desired. Advertising customers may utilize the advertisers subsystem 1552 within the web interface 1554 to register, add or modify banner or other advertisements, set up rules for serving advertisements, check advertising statistics (e.g., click statistics), or accomplish any other advertiser interface option made available, as desired. Customers and their respective task or project developers may utilize the task developer subsystem 1550 to access information within database systems 1546 and modules within the server systems 104, such as the version/phase control subsystem 1528, the task module and work unit manager 1530, and the workload information 308. Customers may also check project results, add new work units, check defect reports, or accomplish any other customer or developer interface option made available, as desired.

Advantageously, the customer or developer may provide the details of the project to be processed, including specific program code and algorithms that will process the data, in addition to any data to be processed. In the embodiment shown in FIG. 1C, this program code takes the form of a task module 1512 within the workload, while the data takes the form of work unit 1514. These two portions make up the project or workload component 1504 of each client agent 270. For a given project, the task module 1512 will likely remain relatively constant, except for version updates, patches or phase modifications, while the work unit 1514 will likely change each time processing of the data that it represents is completed. The project or workload component 1504 runs in conjunction with the base distributed processing system component 1506. When a different customer or project is started on a given client system, the project or workload component 1504 will typically be replaced, while the base distributed processing system component 1506 will likely remain relatively constant, except for version updates, patches or other modifications made for the distributed processing system.

Information sent from the server systems 104 to the client agents 270A, 270B . . . 270C may include task modules, data for work units, and advertising information. Information sent from the client agents 270A, 270B . . . 270C to the server systems 104 may include user information, system information and capabilities, current task module version and phase information, and results. The database systems 1546 may hold any relevant information desired, such as workload information (WL) 308 and client capability vectors (CV) 620. Examples of information that may be stored include user information, client system information, client platform information, task modules, phase control information, version information, work units, data, results, advertiser information, advertisement content, advertisement purchase information, advertisement rules, or any other pertinent information.

Figure 2A:
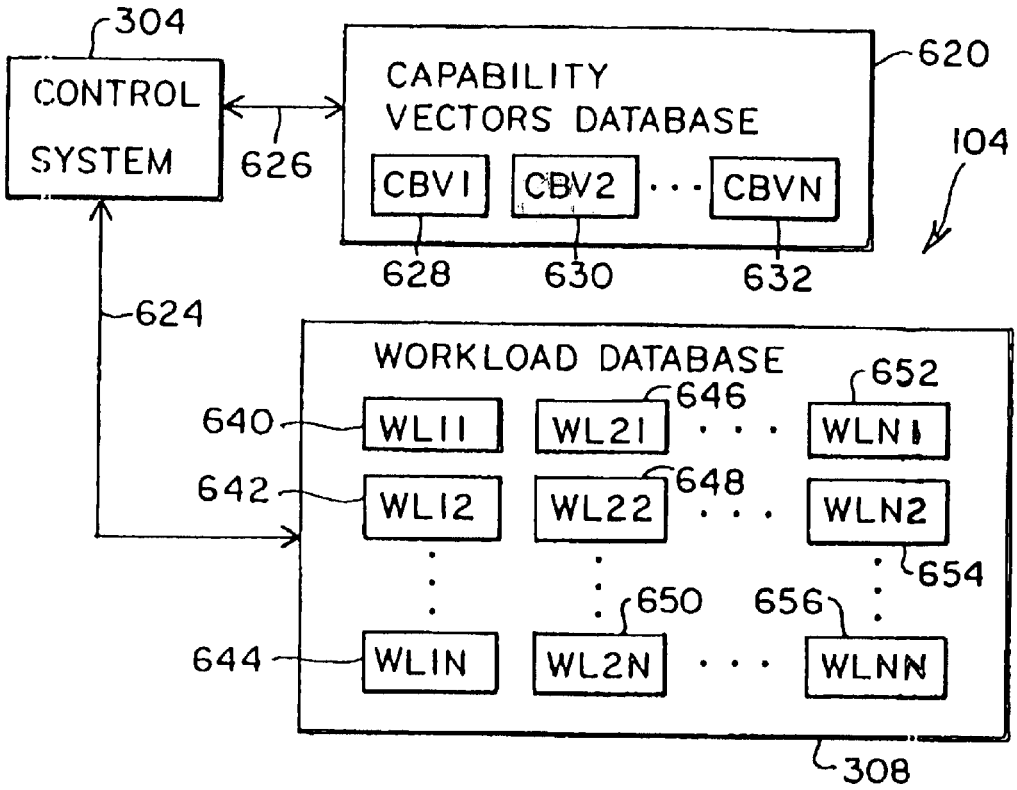
FIG. 2A is a block diagram for a server system according to the present invention, including a control system, a workload database, and a database of client capabilities balancing vectors.

FIG. 2A is a block diagram for a server system 104 according to the present invention, including a control system 304, a workload database 308, and a database of capability vectors 620. The workload database 308 includes a variety of sets of workload projects WL1, WL2 . . . WLN. For each workload project, there may be multiple workload units. For example, workload project WL1 includes workload units WL11, WL12 . . . WLIN, as represented by elements 640, 642 .. . 644, respectively. Similarly, workload project WL2 includes workload units WL21, WL22 . . . WL2N, as represented by elements 646, 648 . . . 650, respectively workload project WLN includes workload units WLN1, WLN2 . . . WLNN, as represented by elements 652, 654 . . . 656, respectively.

It may be expected that different workload projects WL1, WL2 . . . WLN within the workload database 308 may require widely varying processing requirements. Thus, in order to better direct resources to workload projects, the server system may access various system vectors when a client system signs up to provide processing time and other system or device capabilities to the server system. This capability scheduling helps facilitate project operation and completion. In this respect, the capability vector database 620 keeps track of any desired feature of client systems or devices in capability vectors CBV1, CBV2 . . . CBVN, represented by elements 628, 630 . . . 632, respectively. These capability vectors may then be utilized by the control system 304 through line 626 to capability balance workloads.

This capability scheduling according to the present invention, therefore, allows for the efficient management of the distributed processing system of the present invention. This capability scheduling and distribution will help maximize throughput, deliver timely responses for sensitive workloads, calculate redundancy factors when necessary, and in general, help optimize the distributed processing computing system of the present invention. The following TABLE 1 provides lists of capability vectors or factors that may be utilized. It is noted that this list is an example list, and any number of vectors or factors may be identified and utilized, as desired.

TABLE 1

| Example Client Capability Vectors or Factors | | | |
|---|---|---|---|
| 1. | BIOS Support: | a. | BIOS Type (brand) |
| | b. ACPI | c. | S1, S2, S3, and S4 sleep/wake states |
| | d. D1, D2 and D3 ACPI device states | e. | Remote Wake Up Via Modem |
| | f. Remote Wake Up Via Network | g. | CPU Clock control |
| | h. Thermal Management control | i. | Docked/Unlocked state control |
| | j. APM 1.2 support | k. | Hotkey support |
| | l. Resume on Alarm, Modem Ring and LAN | m. | Password Protected Resume from Suspend |
| | n. Full-On power mode | o. | APM/Hardware Doze mode |
| | p. Stand-by mode | q. | Suspend to DRAM mode |
| | r. Video Logic Power Down | s. | HDD, FDD and FDC Power Down |
| | t. Sound Chip Power Down | u. | Super I/O Chip Power Down |
| 2. | CPU Support: | a. | CPU Type (brand) |
| | b. MMX instruction set | c. | SIMD instruction set |
| | d. WNI instruction set | e. | 3DNow instruction set |
| | f. Other processor dependent instruction set(s) | g. | Raw integer performance |
| | h. Raw FPU performance | i. | CPU L1 data cache size |
| | j. CPU L1 instruction cache size | k. | CPU L2 cache size |
| | l. CPU speed (MHz/GHz . . . ) | m. | System bus (MHz/GHz . . . ) speed supported |
| | n. Processor Serial Number | o. | CPUID |
| 3. | Graphic Support | a. | Graphics type (brand) |
| | b. # of graphics engines | c. | Memory capacity |
| | d. OpenGL support | e. | Direct3D/DirectX support |
| | f. Color depth supported | g. | MPEG 1/II decode assist |
| | h. MPEG1/II encode assist | i. | OS support |
| | j. Rendering type(s) supported | k. | Single-Pass Multitexturing support |
| | l. True Color Rendering | m. | Triangle Setup Engine |
| | n. Texture Cache | o. | Bilinear/Trilinear Filtering |
| | p. Anti-aliasing support | q. | Texture Compositing |
| | r. Texture Decompression | s. | Perspectively Correct Texture Mapping |
| | t. Mip-Mapping | u. | Z-buffering and Double-buffering support |
| | v. Bump mapping | w. | Fog effects |
| | x. Texture lighting | y. | Video texture support |
| | z. Reflection support | aa. | Shadows support |
| 4. | Storage Support | a. | Storage Type (brand) |
| | b. Storage Type (fixed, removable, etc.) | c. | Total storage capacity |
| | d. Free space | e. | Throughput speed |
| | f. Seek time | g. | User dedicated space for current |
| | h. SMART capable | | |
| 5. | System | a. | System Type (brand) |
| | b. System form factor (desktop, portable, workstation, server, etc.) | | |
| 6. | Communications Support | a. | Type of Connection (brand of ISP) |
| | b. Type of Connection Device (brand of hardware) | c. | Hardware device capabilities |
| | d. Speed of connection | e. | Latency of connection |
| | f. Round trip packet time of connection | g. | Number of hops on connection type |
| | h. Automatic connection support (yes/no) | i. | Dial-up only (yes/no) |
| | j. Broadband type (brand) | k. | Broadband connection type (DSL/Sat./Cable/T1/Intra-net/etc.) |
| 7. | Memory | a. | Type of memory error connection (none, ECC, etc.) |
| | b. Type of memory supported (EDO, SDRAM, RDRAM, etc.) | c. | Amount of total memory |
| | d. Amount of free memory | e. | Current virtual memory size |
| | f. Total available virtual memory size | | |
| 8. | Operating System | a. | Type of operating system (brand) |
| | b. Version of operating system | c. | Health of operating system |
| 9. | System application software | a. | Type of software loaded and/or operating on system |
| | b. Version of software | c. | Software features enabled/disabled |
| | d. Health of software operation | | |

Figure 2B:
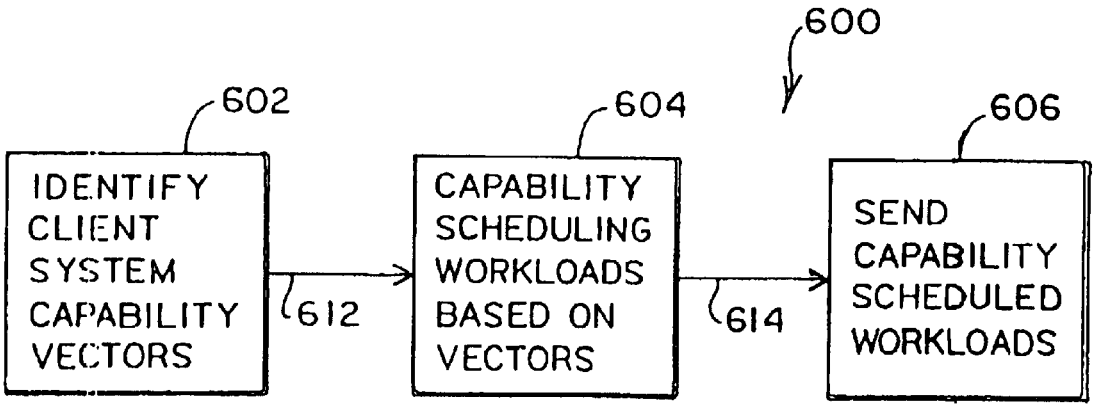
FIG. 2B is a functional block diagram for client capabilities balancing of workloads according to the present invention.

FIG. 2B is a functional block diagram for capabilities determination and scheduling operation 600 for workloads in a distributed processing system according to the present invention. Initially, various vectors are identified for which capability information is desired in the "identify client system capability vectors" block 602. Following line 612, the server systems 104 then capability balances workloads among client systems 108, 110 and 112 based upon the capability vectors in the "capability scheduling workloads based on vectors" block 604. Then the capabilities scheduled workloads are sent to the client systems for processing in the "send capability scheduled workloads" block 606.

This capability scheduling and management based upon system related vectors allows for efficient use of resources. For example, utilizing the operating system or software vectors, workloads may be scheduled or managed so that desired hardware and software configurations are utilized. This scheduling based upon software vectors may be helpful because different software versions often have different capabilities. For example, various additional features and services are included in MICROSOFT WINDOWS '98 as compared with MICROSOFT WINDOWS '95. Any one of these additional functions or services may be desired for a particular workload that is to be hosted on a particular client system device. Software and operating system vectors also allow for customers to select a wide variety of software configurations on which the customers may desire a particular workload to be run. These varied software configurations may be helpful, for example, where software testing is desired. Thus, the distributed processing system of the present invention may be utilized to test new software, data files, Java programs or other software on a wide variety of hardware platforms, software platforms and software versions. For example, a Java program may be tested on a wide proliferation of JREs (Java Runtime Engines) associated with a wide variety of operating systems and machine types, such as personal computers, handheld devices, etc.

From the customer system perspective, the capability management and the capability database, as well as information concerning users of the distributed devices, provide a vehicle through which a customer may select particular hardware, software, user or other configurations, in which the customer is interested. In other words, utilizing the massively parallel distributed processing system of the present invention, a wide variety of selectable distributed device attributes, including information concerning users of the distributed devices, may be provided to a customer with respect to any project, advertising, or other information or activity a customer may have to be processed or distributed.

For example, a customer may desire to advertise certain goods or services to distributed devices that have certain attributes, such as particular device capabilities or particular characteristics for users of those distributed devices. Based upon selected attributes, a set of distributed devices may be identified for receipt of advertising messages. These messages may be displayed to a user of the distributed device through a browser, the client agent, or any other software that is executing either directly or remotely on the distributed device. Thus, a customer may target particular machine specific device or user attributes for particular advertising messages. For example, users with particular demographic information may be targeted for particular advertisements. As another example, the client agent running on client systems that are personal computers may determine systems that are suffering from numerous page faults (i.e., through tracking operating system health features such as the number of page faults). High numbers of page faults are an indication of low memory. Thus, memory manufacturers could target such systems for memory upgrade banners or advertisements.

Still further, if a customer desires to run a workload on specific device types, specific hardware platforms, specific operating systems, etc., the customer may then select these features and thereby select a subset of the distributed client systems on which to send a project workload. Such a project would be, for example, if a customer wanted to run a first set of simulations on personal computers with AMD ATHLON microprocessors and a second set of simulations on personal computers with INTEL PENTIUM III microprocessors. Alternatively, if a customer is not interested in particular configurations for the project, the customer may simply request any random number of distributed devices to process its project workloads.

Customer pricing levels for distributed processing may then be tied, if desired, to the level of specificity desired by a particular customer. For example, a customer may contract for a block of 10,000 random distributed devices for a base amount. The customer may later decide for an additional or different price to utilize one or more capability vectors in selecting a number of devices for processing its project. Further, a customer may request that a number of distributed devices be dedicated solely to processing its project workloads. In short, once device attributes, including device capabilities and user information, are identified, according to the present invention, any number of customer offerings may be made based upon the device attributes for the connected distributed devices. It is noted that to facilitate use of the device capabilities and user information, capability vectors and user information may be stored and organized in a database, as discussed above.

Figure 3A:
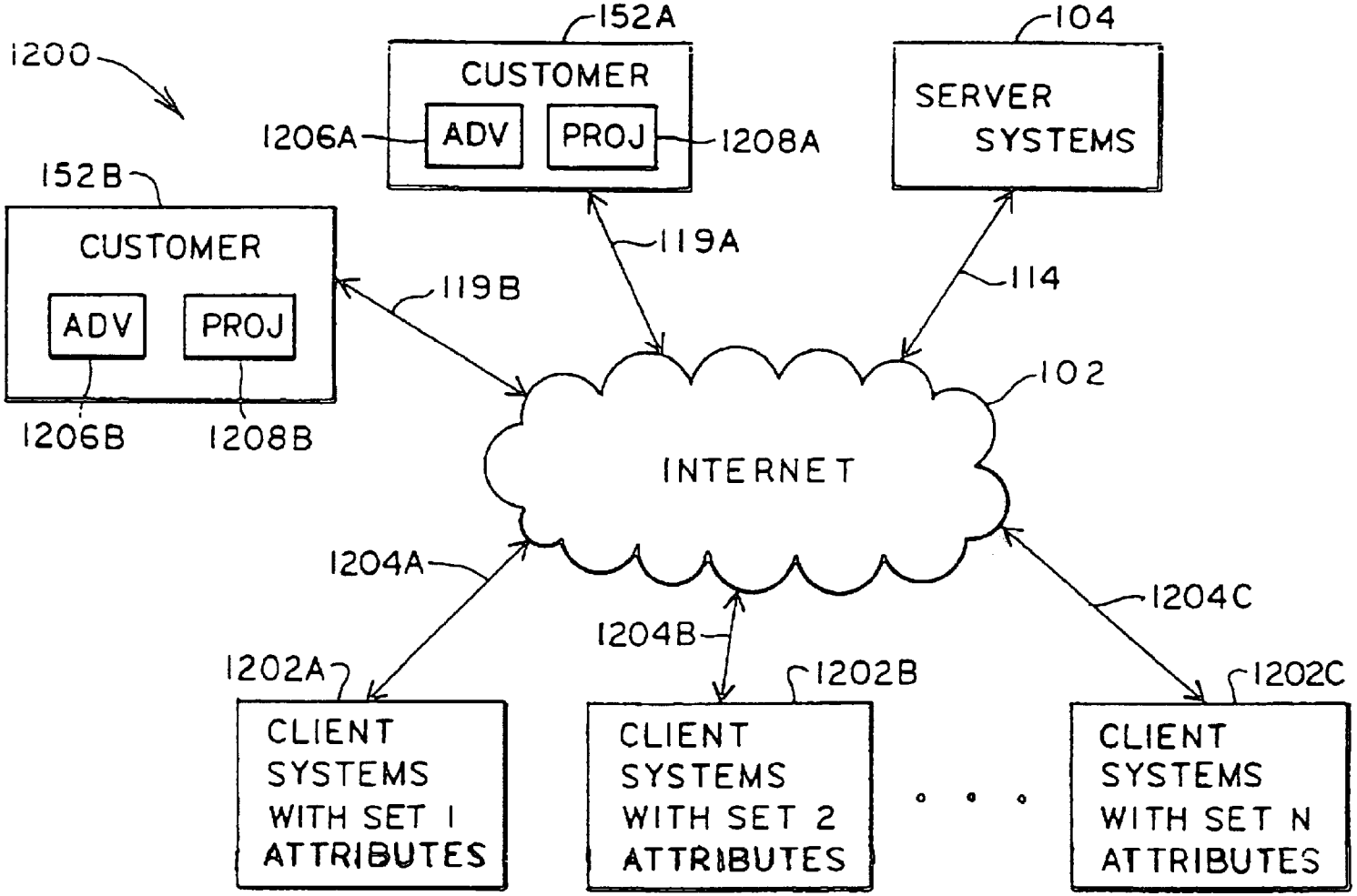
FIG. 3A is a block diagram of a distributed processing system that allows customers to select client system attributes, according to the present invention.

Referring now to FIG. 3A, a block diagram depicts a distributed processing system 1200 that allows customers to select client system attributes, such as device capabilities and user characteristics, according to the present invention. In this embodiment, the network 102 is depicted as the Internet to which server systems 104, customer 152A, customer 152B, and client systems 1202A, 1202B . . . 1202C are connected. These systems are connected through communication links 114, 119A, 119B, 1204A, 1204B . . . 1204C, respectively. As noted above, these communication links may include any of a wide variety of devices and/or communication techniques for allowing a system to interface with other connected systems.

As shown in FIG. 3A, and as discussed above, the customers 152A and 152B may desire to send information or projects, such as advertisements (ADV) 1206A and 1206B and/or projects (PROJ) 1208A and 1208B, to groups of client systems that have particular or selected capabilities. The number of different groups of client systems is as varied as the capability and user data available for those client systems. The client systems 1202A represent client systems that include a first set (Set 1) of desired attributes. The client systems 1202B represent client systems that include a second set (Set 2) of desired attributes. And the client systems 1202C represent client systems that include a Nth set (Set N) of desired attributes. Once attributes are selected, the client systems with those attributes may be accessed as desired by customers 152A and 152B. For example, customer 152A may send its advertisement to client systems 1202B. Customer 152B may send its advertisement to client systems 1202A. The project 1208A from customer 152A may be processed by client systems 1202C. And the project 1208B from customer 152B may be processed by client systems 1202B. It is noted, therefore, that any combination of desired attributes, such as device capabilities and user characteristics, may be identified and utilized to satisfy customer objectives, whether those objectives be advertising, project processing, or some other desired objective.

Figure 3B:
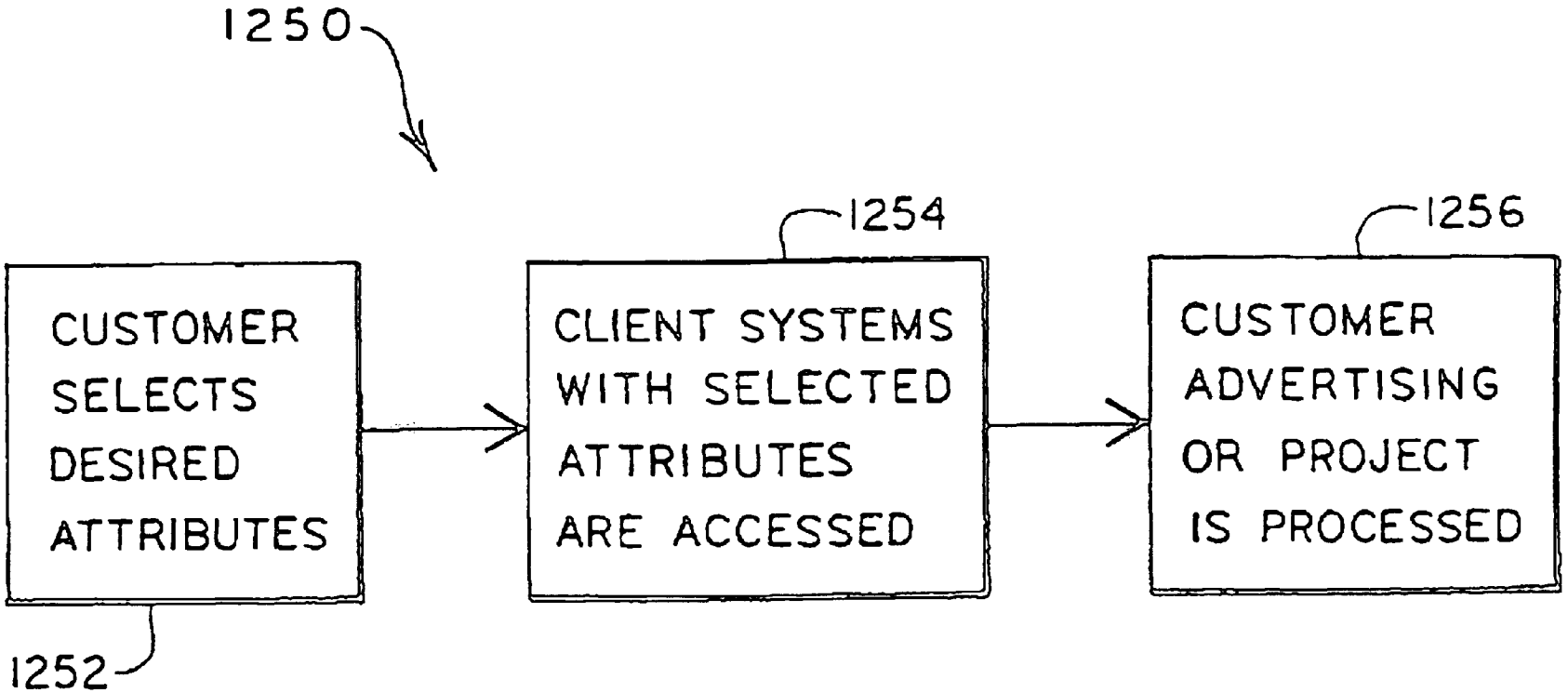
FIG. 3B is a block flow diagram for client system attribute selection, according to the present invention.

FIG. 3B is a block flow diagram for client system attribute selection, according to the present invention. In the embodiment shown, process 1250 begins with the customer selecting desired attributes in block 1252. Next, client systems with selected attributes are accessed in block 1254. And, then in block 1256, the customer objective, such as advertising or project, is processed by the client system. Control of this process 1250 may be provided by the server systems 104, if desired, such that the customer interfaces with the server systems 104 to select device attributes and then the servers systems 104 access the client systems. Alternatively, the server systems 104 may simply provide the customer with a list of contact information (e.g., IP addresses) for the client systems, so that the customer may directly access the client system, for example, in providing advertisements to the users of the client systems. It is further noted that other control techniques may also be used to identify and access client systems with particular desired device capabilities, user characteristics, or other device attributes, according to the client system attribute selection method of the present invention.

FIG. 4A is a block diagram for a distributed processing system 100 according to the present invention, including example network sites 106A and 106B on which site testing is to be conducted, such as load testing and/or quality-of-service (QoS) testing. FIG. 4A is similar to FIG. 1A except that other systems 106 in FIG. 1A has been represented in the embodiment of FIG. 4A with network sites 106A and 106B. Communication line 116A between the network 102 and the network site 106A represents a interaction by one client system 108, 110 and 112. Communication lines 116B, 116C and 116D represent interactions by more than one client system 108, 110 and 112.

Site testing is typically desired to determine how a site or connected service performs under any desired set of test circumstances. With the distributed processing system of the present invention, site performance testing may be conducted using any number of real client systems 108, 110 and 112, rather than simulated activity that is currently available. Several tests that are commonly desired are site load tests and quality of service (QoS) tests. Quality of service (QoS) testing refers to testing a user's experience accessing a network site under normal usability situations. Load testing refers to testing what a particular network site's infrastructure can handle in user interactions. An extreme version of load testing is a denial-of-service attack, where a system or group of systems intentionally attempt to overload and shutdown a network site. Advantageously, the current invention will have actual systems testing network web sites, as opposed to simulated tests for which others in the industry are capable and which yield inaccurate and approximate results.

Network site 106B and the multiple interactions represented by communication lines 116B, 116C and 116D are intended to represent a load testing environment. Network site 106A and the single interaction 116A is indicative of a user interaction or QoS testing environment. It is noted that load testing, QoS testing and any other site testing may be conducted with any number of interactions from client systems desired, and the timing of those interactions may be manipulated and controlled to achieve any desired testing parameters. It is further noted that periodically new load and breakdown statistics will be provided for capacity planning.

FIG. 4B is a functional block diagram for a site-testing operation 700 according to the present invention. Initially, client systems 108, 110 and 112 receive workloads that identify testing procedures and parameters in the "clients receive testing workload" block 702. Following line 714, the client systems 108, 110 and 112 access the site being tested and perform the testing in block "clients interact with other systems" block 704. Next, following lines 716 and 718, the client systems 108, 110 and 112 complete the site testing workload tasks, get the results ready for transmission, and send those results back to the system server 104 in "clients complete testing workload" block 706 and "site testing results sent to server system" block 708. Control passes along line 720 to "site testing results compiled for use" block 710 where the server system formats and/or compiles the results for use by the network site. For example, the site testing results may be utilized determining modifications that need to be made to the network site to handle peak volume activities.

FIGS. 5A and 5B provide example details of a dynamic coordination and control architecture for network site testing and an associated example procedure. Projects for which the present invention is particularly useful, include projects, such as network site testing, in which the customer may desire the activities and processing of the client systems to be scheduled, coordinated and controlled in time with respect to each other and may desire dynamic changes to these timing relationships during the test or project operations. For example, one such scheduled execution (schedex) project could be a project request to process a single workunit on a large number of clients in a particular time range. This scheduled operation can also include dynamic coordination and control of the client systems actively participating in the project, including dynamically controlling the number of active client systems during the project operation. The participating client systems can be cued in advance by downloading the project task module and workunit files for the task, and some client systems can be designated on-hold if an increase in the number of active client systems is ultimately desired. In addition, if client systems are taken out of active participation, these client systems can be added to the pool of on-hold client systems that can be tapped if increases in active clients systems are desired later in the project operations. To control the activities of the client systems, the client systems can be configured to communicate with or poll the server systems at specified time intervals to receive operational instructions in poll response communications from the server systems. In such a scheme, there can be considered two basic types of scheduled execution requests:

Polling. Clients poll the server with a given frequency. The server instructs them to start or stop running the module and can provide other instructions as part of the polling response communications. The number of clients running the module can be adjusted dynamically during the life of the project.

Non-polling. All cued clients start running the module. The start times can be based on a specified distribution specified over a "startup period." Examples of distributions that might be specified are uniform, random, Poisson. If the startup period has zero duration, the cued clients are started simultaneously.

It is noted that more complicated schemes could be implemented, if desired. It is also noted that although this dynamic coordination and control architecture is particularly useful for in supporting website quality of service and load testing, this architecture can more generally be utilized for other projects, if desired.

Looking first to FIG. 5A, an example embodiment is depicted in which the server systems 104 include a poll server 502 and a control server 504. In this embodiment, the poll server 502 operates to off-load poll communication and project coordination and control tasks from the control server 504. As discussed above, the control server 504 can be one or more server systems that perform the server functions of the distributed processing system. The poll server 502 can also be one or more server systems that perform the poll communication and project coordination and control tasks. The server systems 104, including poll server 502 and control server 504, also include a security interface 506 through which the server systems 104 communicate with the client systems as shown by communication link 114. These communications include poll communications between the server systems 104 and the clients systems that are sent and received through the network 102. It is noted that as depicted, the security interface is common to both the poll server 502 and the control server 504; however, a security interface could be included as a particular feature of each server system, if desired. The particular security features implemented can depend upon the desired level of security, and the security features can be different for different types of communications that are sent and received through the security interface 506.

As discussed above, the server systems 104 can be connected to and configured to utilize a variety of databases, as desired. These databases can also store information, as need, that is related to the dynamic coordination and control of tasks and results data. In the embodiment of FIG. 5A, one of the databases is a separate, dedicated poll database 501 that is provided to store data useful for poll communications and coordination and control operations associated with the client systems. And this poll database 501 can be configured to communicate primarily with the poll server 502. These databases also include a client system information database 515, a workload database 308 and a results database 510, each coupled to the control server 504. The client system information database 515 includes a capabilities database 620, a user information database 517 and a database 519 for any other desired attribute of the distributed devices being used as client systems of the distributed computing platform. As also discussed above, this information can be utilized in the processing of a wide variety of projects and to organize, manage, schedule and assign project operations among the plurality of client devices that are part of the distributed processing system, as well as in selecting the particular client systems that are desired to participate in project activities. It is noted that the databases depicted in FIG. 5A are just one example. Other databases could be provided, and the organization of the of data stored in the databases and in which database particular data is stored can be modified and configured, as desired. It is also noted that although the databases in FIG. 5A are shown to be connected to the poll server 502 or the control server 504, these connections could be changed, and the databases could also be shared by the poll server 502 and the control server 504, if such configurations were deemed desirable. Still further, information from databases connected to either the poll server 502 or the control server 504 can be communicated to the other through the communication link 503, along with any other desired interactions between the server systems that make up the server systems 104.

The poll server 502 is provided to allow the control server 504 to off-load much of its management tasks for site testing activities during operation of the tests on the participating client systems. As shown in the example embodiment of FIG. 5A, the control server 504 can provide setup information to the client systems through the security interface 506 and receive back the completed results of the network site testing from the client systems. The control server 504 can transfer test processing information to the poll server 502 along communication link 503, which can also be used as desired for other communications between the poll server 502 and the control server 504. In this way, the control server 504 can be viewed as providing dispatch services for the dynamic coordination and control operations. The poll server 502 can then operate to handle most, or if desired all, of the test operation needs of the client systems as they perform the scheduled execution tasks. As shown, the poll server 502 communicates project control information to the client systems through security interface 506 and receives project related information back from the client systems. It is noted that the functionality of the poll server 502 could be combined with the functionality of the control server 504, if desired. However, this combination may lead to reduced performance and inefficiencies in the overall distributed computing platform. It is also noted that final result data from the client systems could be reported to the poll server 502 for compilation, interpretation, report generation, analysis or other desired processing, and the poll server 502 could then provide the result data and/or the results of any processing of this result data to the control server 504 or an any other desired system or entity, such as, for example, to a project developer or project coordinator through the control interface 509.

The project information and project control information can take any of a variety of forms depending upon the nature of the project being run and the nature of the management and scheduling control desired. For example, as part of the initial project setup or control information provided to the client systems, the client systems can be given poll parameters, such as a poll period, a test start time and a test end time. The poll period refers to information that determines when the client system will communicate with the poll server 502. For example, the poll period information can define a regular time interval, scheduled times or defined times-at which the client systems communicate with the poll server 502 to provide project information such as status of the project on the client system, partial result data, local clock information, or any other desired project related data or information, that may be utilized by the poll server 502 to help manage and coordinate the project operations of the various different client systems. If the poll period is zero, the client system can simply run the project from its start time to finish time without polling the poll server 502. The poll server 502 can send back information such as clock synchronization information, project instructions, poll period changes, or any other desired instructions or information, as desired to manage and coordinate the activities of the client systems conducting the project processing.

A control interface 509 can also be provided. The control interface 509 allows someone formulating and running a project to communicate through link 511 with the control server 504 and the poll server 502. And the control interface 509 can provide a variety of functional controls and information to a user of the interface, such as coordination tools, project overview information, project processing status, project snapshot information during project operations, or other desired information and/or functional controls. For example, with respect to a network site testing project, a tester can use this interface 509 to create the test scripts that are included within the work units that are sent to client systems participating in the test and could set and adjust the poll parameters that are to be used by each client system. The control interface 509 is also used over the duration of the test to view dynamic snapshot information about the current state of the test, including the load on the system, and to use this information to modify test activities such as the number of active clients participating in the test. The broken line 507 represents a demarcation between the servers 502 and 054 and the interface 509. It is noted that the interface 509 could take any of a variety of forms and that the interface 509 can be remote or disconnected from the server systems 104 (which in FIG. 5A include poll server 502 and control server 504). For example, the interface 509 could be a web interface that allows test parameters, test script information and test operations to be created, implemented and modified on the control server 504 and the poll server 502. Procedures that may be accomplished with this interface 509 are further described below. It is also noted that a security interface could be provided between the control interface 509 and the poll server 502 and control server 504, such that the communications through link 511 would have to travel through the security interface. The functionality of this security interface could be combined with the security interface 506, if desired.

FIG. 5B provides an example embodiment for poll procedures 550 that could be utilized to provide coordination and control of the client systems during processing operations for network site testing projects running on the distributed computing platform. Initially, if desired, the attributes of the client systems that are to participate in the project can be selected in block 551 by the customer, project developer or project coordinator. The distributed device or client system attributes, such as device capabilities and user characteristics, can include a wide variety of attributes, including such attributes as geographic location of the users and their systems, client system device type (including brand), operating system type (including brand), ISP (including brand), TCP/IP routing paths used for Internet communications, or any other capability, characteristic, feature, component, quality or item of interest relating to the distributed devices and their users. For example, with respect to the ISP and routing information and a network site testing project, it may be desirable to select client systems so as to test various communication routing or packet routing paths to the site under test. It is noted that the selection of one or more groups of client systems based upon their attributes is also discussed above. It is also noted that the coordination and control of the project, as discussed below, can be conducted utilizing this attribute information for selection, coordination and control of the client systems to be utilized for processing a desired distributed processing project.

Looking back to FIG. 5B, in block 552, the work units are communicated to the client systems. In block 554, initial poll and test parameters for test operation are setup by being communicated to the client systems. These parameters can include any of a wide variety of test operation, platform operation and/or project related settings, including items such as poll periods, test start times and test end times. Prior to the initiation of testing, these communications can also occur between the client systems and the poll server 502 and/or the control server 504 to transfer local and global date/time/clock information so that the activities of the client systems can be synchronized. Next, in block 556, the client systems initiate the site testing at the designated start times. It is noted that the start times could be different for different client systems. In block 558, the test programs operate on the client systems to process the work units, thereby performing the site testing project. If the poll period is set at zero for a given client system, that systems continues to run the test without polling the poll server 502. In decision block 560, the client agent running the test project code determines if the test end time has been reached. In "NO," then the client system continues to run the test. If "YES," then the tests are ended in block 566. Test results are then reported in block 568.

If the poll period is greater than zero, then the client agent running the test project code will poll the poll server 502 at periodic intervals. The poll communications that are received from the client systems in block 562 can include a wide variety of information, as desired. These client system communications, for example, can provide information about the current project operations of the client systems and partial test results for the project. In response to the poll communications from the client systems, the poll server 502 can modify test, load and poll parameters as desired in block 564 to manage, control and coordinate the test activities of the client systems. In decision block 560, the determination is made whether the test end time has been reached. In "NO," then the test continues in block 558. If "YES," then the test ends in block 566. Test results can then be reported, for example, by being sent from the client systems to the control server 504 for compilation and further processing, as desired. The final results can be stored in a results database 510 and can be provided to the customer that requested or sponsored the site testing project. It is noted that the "load" parameter includes the load on the site under test (SUT), and a change to the load could include increasing or decreasing the number of client systems active in the test project. It is also noted that the poll period can be relatively simple, such as a regular time interval at which the client system communicates with the poll server 502. And the poll period could be more complicated, such as a time interval that changes based upon some condition or criteria, or a communication that occurs after a certain event or events during the test processing, such as each time a test routine is completed. In other words, any of a variety of procedures or algorithms could be utilized, as desired, to set the polling activity of the client systems, and each client system could be set to have unique polling instructions.

FIG. 5B also includes blocks 561, in which dynamic snapshot information for the project can be provided, for example, for review by a tester or project coordinator, and block 563, in which desired modifications can be received. These blocks 561 and 563, for example, may represent operations that involve interactions with a tester or project coordinator through the control interface 509 of FIG. 5A, as discussed above. The poll communications received in block 562 are used to form the dynamic snapshot information of current test operations and that is usable by a project coordinator to determine what modifications, if any, the project coordinator desires to be made through the poll response to the client systems in block 564. With respect to a site testing project, for example, the snapshot information can include current test results and load information for the site under test (SUT). This snapshot information can then be reviewed by the tester to determine if any adjustments are desired, such as changing the SUT load by adding or removing client systems that are actively participating in the test operations. In other words, the tester can view the dynamic snapshot information, which in part characterizes the current load on the test system, and use it to dynamically alter the load on the SUT by increasing or decreasing the number of active clients via a control interface 509. In addition, if desired, controls could be put in place to automatically modify the test, load and/or poll parameters depending upon the snapshot shot information or other poll communication information. It is also noted that information from the SUT itself can be received by the server systems and provided, as part of the dynamic snapshot information in block 561, such that in-test data form the SUT itself can be reviewed by a tester or project coordinator.

As stated above, in one example operation, a goal of the poll server 502 and control server 504 is to coordinate a multitude of clients interconnected over the Internet (or other unbounded network) to conduct a project such as load testing a web site. Some advantageous features of this design are the ability to select clients for the load test based on client characteristics, capabilities, components and attributes, and the ability to dynamically alter the number of active clients actively participating in the test. This is an improvement on the prior techniques where the client systems were typically simulated on a small number of test machines, leading to less accurate results. Other coordinated applications that can use this method of control include measuring the quality of service (QoS) of a site under test.

As shown in FIG. 5A, the components of the poll server architecture can include the set of remote network-connected clients 108, 110 . . . 112, a dispatch or control server 504 which schedules work to client machines, and a poll server 502 that handles periodic communications from client machines. In this poll server architecture, the following example procedure steps can be used as part of the poll procedures 550 and associated network site load test operations, as discussed above.

1. Dynamic coordination and control of a load test is initiated by sending a create command to the server with information about the time, duration, size and type of the test. The following parameters are specified:
   a. Start and end time of the test. The start time is usually specified at some time in the future.
   b. Test script to be run by each client. The scripts can be identical or can be randomized to represent the behavior of several web users.
   c. Specification of number and mix of clients desired. The mix of clients can be based on client geography, machine type, or bandwidth.
   d. Initial number of clients to run
2. The server attempts to cue clients for the load test based on the specified mix. All cued clients are sent the following information:
   a. Start and end time of the test
   b. Test script to be run
   c. Poll interval, the interval between successive times when the client contacts (polls) the poll server.
3. A control interface or web console 509 is used by the person or developer conducting the test to set parameters for the test and view dynamic statistics as the test progresses.
4. After the requested or required number of clients has been cued, the test is ready to begin. At the specified start time, all cued clients contact the poll server for instructions. The poll server 502 tracks the state of each client and is able to estimate the total number of clients available, and the number of clients currently running the test script.
5. The target number of running clients can be modified dynamically during the test. A typical usage would be to start the test with a small number of running clients, and then gradually increase the number of running clients, thus increasing the load on the web site. The poll server attempts to adjust the number of running clients to match the target. If the target is increased, the poll server would instruct additional clients to join in the test. To stop the test, the target number of running clients is set to zero. The polling mechanism also allows the system to recover from client failures during a test. In this case, the poll server can detect a client failure and activate another client to take its place in the test.
6. The client passes dynamic results to the poll server during each poll. The dynamic statistics include throughput, hits per second and errors found. These statistics are combined to give a snapshot view of the current performance of the web site under test. This snapshot information can be used by the tester to modify the test parameters (number of active clients, poll interval, etc.) or even to stop the test if the desired load level has been reached.
7. Upon completion of the test, all participating clients send back detailed statistics from the test, which are aggregated and presented to the person conducting the test.

This coordinated testing architecture could be used for other network site testing operations. For example, it can be used for quality of server (QoS) testing, where the typical goal is to be able to measure response times at Internet connected desktops in order to gauge the user experience when browsing a website (e.g., the site under test (SUT)). The number of active clients selected for QoS testing is typically much smaller than the number for load testing, but the selected active clients are typically spread across the network (e.g., geographically, and by ISP). Each client periodically runs a project workload script making HTTP commands to one or more websites and measures the response times from each. These summarized results are returned to the poll server 502 which aggregates results across all active clients and generates reports for each website being tested. The active clients in this case typically do not, by themselves, add significant load to the SUT. The load on the SUT is the normal load generated by browsing on the Internet. The active clients are merely providing performance measurement data at a wide variety of points across the Internet, and their results tend to provide a true reflection of what a person browsing on his desktop would see when interacting with the SUT. For example, QoS testing can identify performance bottlenecks over time by geography, ISP, machine type, system type or related other possible factors. For example, a website might be able to determine that response times at night to machines within a major ISP are much longer than the mean response time.

There are a number of advantageous that are provided by the poll server architecture of the present invention. For example, where the network is the Internet, it is expected that the set of clients on the Internet are non-dedicated resources. Thus, there is desirably a mechanism to keep track of the current state of each client system. This task is difficult to accomplish in an efficient and reasonable manner by the dispatch or control server alone, which is also responsible for scheduling distributed computing work to all other clients in the distributed computing network. One method for getting the state of a client machine is to have a listening port on the client, which is queried by the server to get status information. In other words, instead of the polling by the client system to the poll server as indicated above, the poll server could initiate contact to each client system. However, due to the reluctance of information technology managers, individual PC owners, and others who control client systems to have open ports on their machines, the alternative where the client system periodically communicates with the poll server to sends summary status information and to receive test instructions is likely a method that is more widely acceptable. It is noted that the poll server 502 and the dispatch/control server 504 can each be one or more server systems that operate to perform desired functions in the dynamic coordination and control architecture. It is also again noted that the poll server 502 and control server 504 could be combined if desired into a single server system or set of systems that handles both roles. However, this would likely lead to a more inefficient operation of the overall distributed processing system.

As discussed above, a poll server 502 can be used to offload the polling connections from the main server 504. (The poll requests can be short, unencrypted, unauthenticated, single-turnaround requests from the client agent running on each client system.) Without the separate poll server, there are communication requirements that would likely reduce the performance of the distributed computing platform, for example, the number of database queries that can be handled at a given time and the number of connected client systems at a given time. This architecture of the present invention helps to improve performance by offloading the work of handling agent poll requests to another server. It is noted, however, that the present invention could still be utilized without offloading the polling functions, if this were desired. In general, the polling server 502 can be designed to open a single connection to a database to retrieve information about active schedex records. Periodically, the poll server 502 can use this database connection to refresh and update current running count information. On each agent poll request, the poll server 502 uses data structures in memory to determine whether the client system should start, stop, or terminate.

The client systems can make the polling connection to the server using TCP. However, UDP could be utilized to reduce the overhead inherent in TCP connection establishment. If the agent has a proxy configured, however, then UDP will likely not work. Otherwise, UDP could be tried, and if no response were received, TCP could be used as a fall back communication protocol. When the agent receives a new schedex record, one of the attributes can be the address of a polling server where the client will send poll requests. If this is not specified, the agent can fall back to using the main server address. It is noted, however, that in the latter case a different port would preferably be utilized on the main server, because the polling server function is best viewed as a separate process from the main server function.

In a more-generalized environment, where the server systems include multiple dispatch servers, each responsible for a different set of project applications, the poll server could have a broader function of tracking outstanding messages for delivery to clients the next time they contact the poll server. Periodic polling by a client systems can improve the responsiveness of the system. For example, if the person conducting the test stops a project currently running on the distributed computing system, the poll server can obtain a list of all client systems processing work on behalf of the project and its workloads and can instruct these client systems to stop the currently executing workload and return to the dispatch server to get a new piece of work. In addition, high priority jobs entering the system can be immediately serviced by having the poll server draft clients from a client system resource pool by issuing a preempt call to the client at the next poll. This preempt call would preempt all pending work being done by the client system and would start operation of the high priority job on the selected client systems.

EXAMPLE IMPLEMENTATION DETAILS

To further describe the dynamic coordination and control architecture of the present invention (referred to below in relation to a scheduled execution (schedex) project), example polling procedures, poll communications, initialization parameters, test parameters, management, coordination and control procedures and associated function calls are now discussed.

A scheduled execution (schedex) project can also have associated with it a variety of polling and related test parameters. For example, the following attributes can be provided:

poll_period_sec—How frequently (in seconds) clients should poll the server while they are running. This determines how long until control actions take effect (see below). Zero for a non-polling execution.

IDs—task and workunit IDs startup_start_time—The beginning of the startup period.

startup_end_time—The end of the startup period (defined only for a non-polling execution).

end_time—The end of the execution period. Any clients still running at this time will be gracefully terminated.

nhosts_cue—How many hosts to cue. NOTE: the server attempts to choose hosts that are likely to be running during the execution period, but not all of them actually will be. So the maximum number of running hosts may be less than this.

nrunning_target—how many hosts should run the module (defined only for a polling execution).

state—The example states are "being edited", "activated", "running", and "completed".

A scheduled execution project can further define client type quotas for the number of cued client systems possessing particular attribute values. The attribute types can include any of a variety of client capabilities, attributes and components as discussed above, for example, with respect to personal computers, the attributes can include geographic location such as country, device operating system, and downstream bandwidth. The client system type quotas can be used to limit the client systems to which the server systems distribute the scheduled execution project. For each quota, the server system can maintain a counter of the number of client systems with that attribute that have been cued so far to participate in the particular scheduled execution project. Client systems can be considered in a non-deterministic order. For each client system, the UD server checks whether the counters for the client systems particular attributes are less than the corresponding quotas. If so, the scheduled execution project is cued on that client system. These selection parameters can be used to accomplish various goals. Some examples are provided below.

For example, suppose that the number of client systems (or hosts) to cue is 1000, such that nhosts_cue=1000.

If the tester wants at least 50% of the hosts to be from Canada, the following could be used:

<attr_type="country", value="Canada", quota=1000>
<attr_type="country", value="*", quota=500>

If you want exactly 50% each from Canada and Poland, use

<attr_type="country", value="Canada", quota=500>
<attr_type="country", value="Poland", quota=500>
<attr_type="country", value="*", 0>

If, in addition, you want only Windows computers, use

<attr_type="country", value="Canada", quota=500>
<attr_type="country", value="Poland", quota=500>
<attr_type="country", value="*", quota=0>

<attr_type="OS", value="Win95", quota=1000>
<attr_type="OS", value="Win98", quota=1000>
<attr_type="OS", value="WinNT", quota=1000>
<attr_type="OS", value="*", quota=0>

It is noted that the above parameter system may not able to express some requirements, such as a requirement that at least 25% of the clients are from one country and at least 25% are from another. However, if desired, additional execution parameters could be added to provide such capability. It is also noted that client system type quotas discussed above may be designed such that they affect the set of hosts on which the scheduled execution project is cued and not the hosts on which the project actually runs. For example, client systems could be chosen to run the scheduled execution project essentially randomly, so the properties of the set of running hosts will generally approximate those of the set of cued hosts; however, they may not match exactly. There may be exceptions, for example, if the scheduled execution project is scheduled at a time when most hosts in Poland are turned off, the fraction of running Polish hosts may be smaller than desired.

The control or console interface 509, which can be an Internet web interface, can be configured to allow a variety of tasks, including (1) create, edit and activate a scheduled execution project, (2) to control a scheduled execution project while it is running by viewing and adjusting the number of clients running the scheduled execution project (if polling by client systems is implement, these adjustments will likely have a certain lag time associated with the poll period until they go into effect), and (3) to mark a scheduled execution project as "completed" to stop operation on all running clients. Alternatively, the same operations are available as HTTP RPCs (Remote Procedure Calls).

The scheduled execution architecture of the present invention lends itself to a variety if implementations. Example implementation and operation details are provided below with respect to function calls and operations that may be utilized to realize the present invention.

Create a schedex

```
<schedex_create>
  <task name="foo"/>
  <schedex_name value="foo"/>
  <phase value="1"/>
  <wuid value="23"/>
  <startup_start_time value="123456"/>
  <startup_end_time value="12345"/>
  <end_time value="12345"/>
  <poll_period value="44"/>
  <nhosts_cue value="123"/>
  <quota attr_type="country" value="Poland" quota="100"/>
  <quota attr_type="country" value="United States" quota="100"/>
  <quota attr_type="country" value="Any" quota="100"/>
  <quota attr_type="OS" value="Win95" quota="100"/>
  <quota attr_type="OS" value="WinNT" quota="100"/>
  <quota attr_type="OS" value="Macintosh" quota="100"/>
  <quota attr_type="downstream_bandwidth" value="0_30000"
    quota="100"/>
  <quota attr_type="downstream_bandwidth" value="30000_100000"
    quota="100"/>
  <quota attr_type="downstream_bandwidth" value="100000_"
    quota="100"/>
</create_schedex>
```

It is noted that this is an example operation to creates and activate a scheduled execution project for a given task. Times are given in seconds. The return value "status" is "OK" if the operation succeeded, else a description of the error.

Set number of running clients

```
<schedex_nhosts_set>
    <task name="foo"/>
    <schedex name="foo"/>
    <nhosts value="55"/>
</schedex_nhosts_set>
```

It is noted that this operation requests a change in the number of clients running the scheduled execution project. If client system polling is utilized, it will typically take up to "poll_period" seconds for this target to be reached. If the number is increased, additional clients (cued but not yet running) are started. If the number is decreased, the application is gracefully terminated on some hosts, creating a result file on each host. If the application is later started on the host, additional result files will be created.

Terminate a schedex

```
<schedex_terminate>
    <task name="foo"/>
    <schedex name="foo"/>
</schedex_terminate>
```

It is noted that the scheduled execution project is gracefully terminated on all hosts. In this example, no further operations on the scheduled execution project are allowed. The transfer of result files to the server systems is started.

Get schedex status

```
Request:
<schedex_status>
    <task name="foo"/>
    <schedex name="foo"/>
</schedex_status>
Reply:
<schedex_status>
    <status value="OK"/>
    <nhosts_cued value="234"/>
    <nhosts_running value="234"/>
    <nhosts_available value="234"/>
</schedex_status>
```

It is noted that this operation returns the number of client cued to run the scheduled execution project, the number currently running it, and the number of clients available to run it (i.e. that are actively polling the server). The latter two numbers arc defined only for a scheduled execution project where client system polling is utilized Scheduled Execution (Schedex) Protocol Regular (<request>) RPCs can include the following item in both requests and replies.

```
<schedex>
    id=n
    taskid=n
    wuid=n
    startup_start_time=n
    startup_end_time=n
    end_time=n
</schedex>
```

The client tells the server what schedex workloads are currently cued. The server gives the client new schedex workloads to cue.

Clients with a cued, active polling schedex periodically make the following RPC:

```
request:
<schedex_poll_request>
        schedexid=n
        hostid=n
        running=n
</schedex_poll_request>
reply:
<schedex_poll_reply>
        [ <schedex_start> ]
        [ <schedex_stop> ]
        [ <schedex_terminate> ]
</schedex_poll_reply>
```

It is noted that <schedex_stop/> tells the client to stop a running schedex, <schedex_start/> tells the client to start a cued schedex, and <schedex_terminate/> says to stop a schedex if running and delete it.

Database

The schedex table, in addition to the schedex attributes, can include the following:

```
struct SCHEDEX {
    ...
    int ncued;              // how many hosts are cued
    int nrunning_target;    // how many hosts we want to be running};
```

The schedex_host table stores hosts on which the schedex is cued.

```
struct SCHEDEX_HOST {
    int hostid;
    int schedexid;
    double poll_deadline; // if don't get a poll RPC before this
                          time,
                          // assume host is not running
    int is_running;       // whether host is running app module};
```

(It is noted that the number of running clients can be found by counting the number of records with "running" set.

The schedex — quota table stores quoas:

```
struct SCHEDEX_HOST {
    int id;
    int schedexid;
    int attr_type;
    char value[64]
    int quota;
    int ncued;
```

Server

The server maintains in-memory copies of the schedex and schedex_quota tables.

GLOBALS::check_schedex(CLIENT_CONN&cc)

When the server handles a <request> RPC, and there is a schedex with ncued <nhosts_cue, and the host is of eligible type and not barred by user preferences from running the schedex, and doesn't already have an overlapping schedex, and no quotas are exceeded, the server sends the host that schedex. If the schedex is polling, it creates a schedex_host record. It updates and reloads the schedex and schedex_quota entries.

CLIENT_CONN::handle_schedex_poll( )

When a <schedex_poll_request> RPC is received, the server looks up the schedex_host record. If not found it returns a <schedex_terminate> (this should never happen). If the client is running this module, and number of running hosts is more than nrunning_target, the server returns a <schedex_stop> and clears the running field in the schedex_host record. Similarly, if the client is not running this module and the number of running hosts is less than nrunning_target, the server returns a <schedex_start> and sets the running field in the schedex_host record. In any case it updates the "last poll time" field in the DB.

GLOBALS::schedex_timer( )

Each server periodically enumerates all server_host records with the "running" flag set and "poll deadline" <now—poll period, and clears the "running" flag. When a schedex end_time is reached each server changes the state to "ended" and clears the "running" flag of all schedex_host records. It is noted that in principle the above tasks can be accomplished by one server, but it may be better for all servers to do them.

Client

The client stores a list of pending schedex workloads in memory and in the core state file. It also may have variables, such as:

```
int schedex_active;
int schedex_polling;
SCHEDEX active_schedex;
int schedex_running;
double schedex_timer;
    // if polling: when to send next RPC
    // if nonpolling: when to start
```

When a polling schedex becomes active, the client sets the polling timer randomly in the interval [now . . . , now+polling_period].

INSTANCE::schedex_timer_func( )

The client maintains a polling timer for each active polling schedex. When this reaches zero, it sends a poll RPC. If the schedex remains active, it resets the timer. When a non-polling schedex becomes active, the client picks a start time randomly in the startup period. When the end time of a schedex is reached, the client stops it (if running) and removes it from the data structure. If no other cued schedex references the same workunit, it removes the workunit.

Data Structures

The polling server maintains a list of "active" schedex records and the current number of hosts running that schedex task:

```
struct SchedexPollInfo {
  SCHEDEX schedex;
  int running_hosts; // this should he moved into the database SCHEDEX
record
  SchedexHostList *host_list;
};
```

This list is indexed by schedex identification. Schedex records will be added and removed infrequently, but there will be one lookup on this table per poll request.

The SchedexHostList is a list of hosts that are currently running the schedex task. The list consists of records containing the following information:

```
struct SchedexHostInfo {
    int hostid;
    time_t poll_deadline;
    bool is_running;
};
```

This list is indexed by host identification. Hosts will be added once during the lifetime of the schedex task, and removed en masse at the end of the schedex. There will be one lookup on this table per poll request.

Poll Requests

Each poll request contains the following information:

Schedex id

Host id

Agent's is_running flag

Each poll response can contain zero or one of the following commands:

<schedex_start>—tells the agent to start running the schedex task.

<schedex_stop>—tells the agent to stop running the schedex task, but continue to poll.

<schedex_terminate>—tells the agent to stop running the schedex task, remove the schedex record, and no longer poll.

Operation

On each poll request, the server performs the following sequence of operations:

```
Look up schedex id in list of schedexes.
If not found then
    Look up schedex record in database
    If not found then
        Return <schedex_terminate> command
    End if
    Add schedex record to list of schedexes
    Set the running_hosts to 0
End if
If the current time is past the schedex end time then
    Return <schedex_terminate> command
End if
Look up the host id in the list of hosts for this schedex
If not found then
    // see note below about validating host id
    Add host record to host list
    Set is_running to the agent's is_running
End if
Update the poll_deadline to the current time plus the grace period
multiplier (2 or 3) times the poll_period
If agent is_running != our is_running then
    Set our is_running flag to the same as the agent is_running
    Adjust out running_hosts count up or down one as necessary
End if
If not is_running and running_hosts < nrunning_target then
    Set our is_running true
    Increment running_hosts
    Return <schedex_start>
Else if is_running and running_hosts > nrunning_target then
    Set our is_running false
    Decrement running_hosts
    Return <schedex_stop>
End if
Return empty response
```

An invariant after this operation is that the running_count for the schedex should match the number of host records where the is_running flag is set.

The poll server also runs a background process that periodically performs (every 10 seconds or perhaps more often) the following operations:

```
For each schedex in the schedex list
    Read the schedex record from the database to obtain the current
nrunning_target
    If the current time is past the schedex end time
        Remove the entire schedex host line
    Else
        For each host in the schedex host list
            If the current time is past the poll_deadline then
                Set is_running to false
                Decrement running_hosts
            End if
        End for
    End if
    Update the running_hosts in the database schedex record
End for
```

If the schedex poll server crashes, recovery is performed by loading all the schedex records from the database where the current time is greater than or equal to the start time, but less than the end time. These records will contain the running hosts count from the last periodic update. This procedure should happen every time the server is started, so there is no need to detect whether the previous run of the server crashed or not.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures for database processing. For example, equivalent elements may be substituted for those illustrated and described herein, and certain features of the invention may be utilized independently of the use of other features, all as would be apparent to one skilled in the art after having the benefit of this description of the invention.

What is claimed is:

1. A method of providing dynamic coordination of distributed client systems in a distributed computing platform, comprising:

providing at least one server system coupled to a network;

providing a plurality of network-connected distributed client systems, the client systems having under-utilized capabilities and running a client agent program to provide workload processing for at least one project of a distributed computing platform;

utilizing the server system to distribute workloads for *the* at least one project to the client systems and to distribute initial project and poll parameters to the client systems;

receiving poll communications from the client systems during processing of project workloads by the client systems, wherein a dynamic snapshot information of current project status is provided based at least in part upon the poll communications;

analyzing the poll communications to determine whether or not to make one or more modification to the *initial* project and poll parameters, wherein the modifications to the *initial* project and poll parameters utilize the dynamic snapshot information to determine whether to change how many client systems are active in the *at*

*least one* project, and if a fewer number is desired, including within a polling response communications a reduction in the number of actively participating clients, and if a greater number is desired, adding client systems to active participation in the *at least one* project;

sending the poll response communications to the client systems to modify the *initial* project and poll parameters depending upon one or more decisions reached in the analyzing step; and repeating the receiving, analyzing and sending steps to dynamically coordinate project activities of the plurality of client systems during project operations.

2. The method of claim 1, wherein the initial project and poll parameters comprise a poll period setting for each client system that determines when the client system will poll the server system.

3. The method of claim 2, wherein the poll period setting for a plurality of the client system*s* are the same.

4. The method of claim 1, where*in* in the poll communications from the client systems comprise current project status information.

5. The method of claim 1, wherein the client systems participating in [a] *the at least one* project are assigned as active client systems and on-hold client systems, such that the active client systems actively process the project workload*s* and the on-hold client systems form an on-hold pool of client systems that are capable of being added to active participation.

6. The method of claim 5, wherein the client systems added to active participation in the *at least one* project are selected from the on-hold pool, and wherein client system*s* removed from active participation in the *at least one* project are added to the on-hold pool.

7. The method of claim 1, wherein the network comprises the Internet.

8. The method of claim 1, wherein the *at least one* project comprises network site testing and the dynamic snapshot information comprises current load on a network site under test (SUT).

9. The method of claim 1, wherein the at least one server [ststem] *system* comprises at least one control server and least one poll server system, the poll server system operating to handle the poll communication with the client systems.

10. The method of claim 1, wherein the *at least one* project comprises network site testing.

11. The method of claim 10, wherein the site testing is quality of service testing, or load testing, or *and* denial of service testing [to], *and wherein site testing is applied to testing* content delivery from a network site.

12. The method of claim 10, wherein the initial test and poll parameters comprise a test start time, test slop time and poll period information.

13. The method of claim 1, further comprising identifying attributes for the client systems, storing the attributes in a database, and utilizing the attributes to select the client systems for participation in the *at least one* project.

14. The method of claim 13, wherein the attributes comprise device capabilities for the client systems.

15. The method of claim 13, wherein the network comprise*s* the Internet, wherein the *at least one* project comprises network site testing, and wherein the attributes comprise geographic location of the client system, type of device for the client systems or operating used by the client systems.

16. The method claim 13, wherein the network comprises the Internet, wherein the *at least one* project comprises network site testing, and wherein the attributes comprise ISP information (Internet Service Provider) for the client systems [or], *and* routing information to a site under test for the client systems.

17. The method of claim 1, wherein one of the *at least one* projects comprises network site testing, and *wherein the method* further [comprising] *comprises* transferring a core agent module and a site testing project module to the client system, the site testing project module being capable of operating on the core agent module to process site testing workloads.

18. A distributed computing platform having dynamic coordination capabilities for distributed client systems processing project workloads, comprising:

a plurality of network-connected distributed client systems, the client systems having under-utilized capabilities;

a client agent program configured to run on the client systems and to provide workload processing for at least one project of a distributed computing platform; *and* at least one server system configured to communicate with the plurality of client systems through a network to provide the client agent program to the client systems, to send initial project and poll parameters to the client systems, to receive poll communications from the client systems during processing of the project workloads, wherein a dynamic snapshot information of current project status is provided based at least in part upon the poll communications from the client systems, to analyze the poll communications utilizing the dynamic snapshot information to determine whether to change how many client systems are active in the *at least one* project, wherein if a fewer number is desired, including within a poll response communications a reduction in the number of actively participating clients, and if a greater number is desired, adding client systems to active participation in the *at least one* project within a poll response communications, the server system repeatedly utilizing the poll communications and the poll response communications to coordinate project activities of the client systems during project operations.

19. The distributed computing platform of claim 18, wherein the initial project and poll parameters comprise a poll period setting that determines when the client system will poll the server system.

20. The distributed computing platform of claim 19, wherein the poll period settings for a plurality of the client system*s* are the same.

21. The distributed computing platform of claim 18, wherein the poll communications from each client comprise identification, project status information and current poll period setting information.

22. The distributed computing platform of claim 18, further comprising a poll database configured to store poll related information about each client system.

23. The distributed computing platform of claim 22, wherein the at least one server system comprises at least one control server and at least one poll server system, the poll server system being coupled to the poll database and being configured to handle the poll operations of the client systems.

24. The distributed computing platform of claim 23, wherein one of the *at least one* projects comprises a network site testing project.

25. The distributed computing platform of claim 24, wherein the client agent program comprises a core agent module and a site testing project module, the site testing project module being capable of operating on the core agent module to process site testing workloads.

26. The distributed computing platform of claim 24, wherein the initial project and poll [information] *parameters* comprises a test start time, a test stop time and poll period information.

27. The distributed computing platform of claim 23, further comprising a control interface configured to [communication] *communicate* with the server system, the control interface allowing coordination of the client system participating in the network site testing project.

28. The distributed computing platform of claim 27, wherein the poll server is configured to provide dynamic snapshot information through the control interface and to receive modifications to the [network testing] *initial* project and poll parameters for ongoing project operations.

29. The distributed computing platform of claim 28, wherein the modifications are configured to include modifications to how many client systems are active in the network site testing project.

30. The distributed computing platform of claim 29, wherein the client systems participating in [a] *the at least one* project are assigned as active client systems and on-hold client systems, such that the active client systems actively process the project workload*s* and the on-hold client systems form an on-hold pool of client systems that are capable of being added to active participation.

31. The distributed computing platform of claim 18, further comprising an attributes database coupled to the server system, the database configured to store attributes of the client systems.

32. The distributed computing platform of claim 31, the server system further configured to allow selection of the client systems for project participation based upon identification of desired client system attributes.

33. The distributed computing platform of claim 32, wherein the attributes comprise device capabilities for the client systems.

*34. In a server system communicatively coupled to a network via a communication interface, a method of providing dynamic coordination of distributed client systems, the method comprising:*

*distributing via the communication interface workloads for at least one project, and initial project and poll parameters, to each of a plurality of client systems that is communicatively connected to the network, each of the plurality of client systems running a client agent program to provide workload processing for the at least one project;*

*receiving via the communication interface poll communications from the plurality of client systems during processing of project workloads by the plurality of client systems, the poll communications providing at least part of a dynamic snapshot information of current project status;*

*analyzing the poll communications to determine whether or not to make one or more modifications to the initial project and poll parameters, wherein the modifications to the initial project and poll parameters utilize the dynamic snapshot information to determine whether to change how many client systems are active in the at least one project, and if a fewer number is desired, including within a polling response communications a reduction in the number of actively participating clients, and if a greater number is desired, adding client systems to active participation in the at least one project;*

*transmitting via the communication interface the poll response communications to the plurality of client systems to modify the initial project and poll parameters depending upon one or more decisions reached in the analyzing step; and*

*repeating the receiving, analyzing and transmitting steps to dynamically coordinate project activities of the plurality of client systems during project operations.*

*35. The method of claim 34, wherein the initial project and poll parameters comprise a poll period setting for each client system that determines when the client system of the plurality of client systems will poll the server system.*

*36. The method of claim 35, wherein the poll period setting for the plurality of the client systems are the same.*

*37. The method of claim 34, where in the poll communications from the plurality of client systems comprise current project status information.*

*38. The method of claim 34, wherein the client systems participating in at least one project are assigned as active client systems and on-hold client systems, such that the active client systems actively process the project workloads and the on-hold client systems form an on-hold pool of client systems that are capable of being added to active participation.*

*39. The method of claim 38, wherein the client systems added to active participation in the at least one project are selected from the on-hold pool, and wherein client systems removed from active participation in the at least one project are added to the on-hold pool.*

*40. The method of claim 34, wherein the network comprises the Internet.*

*41. The method of claim 34, wherein the at least one project comprises network site testing and the dynamic snapshot information comprises current load on a network site under test (SUT).*

*42. The method of claim 34, wherein receiving via the communication interface poll communications from the plurality of client systems comprises receiving poll communications at a poll server system of the server system,*

*and wherein transmitting via the communication interface the poll response communications to the plurality of client systems comprises sending the poll response communications from the poll server system of the server system.*

*43. The method of claim 34, wherein the at least one project comprises network site testing.*

*44. The method of claim 43, wherein the site testing is one of quality of service testing, load testing, and denial of service testing, and wherein the site testing is applied to testing content delivery from a network site.*

*45. The method of claim 43, wherein the initial test and poll parameters comprise a test start time, test stop time and poll period information.*

*46. The method of claim 34, further comprising identifying attributes for the plurality of client systems, storing the attributes in a database, and utilizing the attributes to select the client systems for participation in the at least one project.*

*47. The method of claim 46, wherein the attributes comprise device capabilities for the plurality of client systems.*

*48. The method of claim 46, wherein the network comprises the Internet, wherein the at least one project comprises network site testing, and wherein the attributes include at least one of: geographic locations of the plurality of client systems, type of device for each of the plurality of client systems, and operating system used by each of the plurality of client systems.*

*49. The method claim 46, wherein the network comprises the Internet, wherein the at least one project comprises network site testing, and wherein the attributes include at least one of ISP information (Internet Service Provider) for the plurality client systems, and routing information to a site under test for the plurality client systems.*

*50. The method of claim 34, wherein one of the at least one project comprises network site testing, and wherein the method further comprises transferring a core agent module and a site testing project module to the plurality of client systems, the site testing project module being capable of operating on the core agent module to process site testing workloads.*

*51. A server system comprising a network interface, the server configured to:*

*distribute to each of a plurality of client systems via the network interface workloads for a project that is configured to be carried out by a client agent program executing on each of the plurality of client systems;*

*transmit to each of the plurality of client systems via the network interface initial project and poll parameters applicable to workload processing of the project by the client agent program;*

*receive via the network interface poll communications indicative of ongoing workload processing of the project by the client agent program executing the each of the plurality client systems, wherein the poll communications provides at least a partial basis for a dynamic snapshot information of current project status;*

*analyze the poll communications utilizing the dynamic snapshot information to make a determination of whether to change a current number of client systems that are active in the project;*

*transmit via the network interface a poll response communications, wherein the poll response communications include a reduction in the current number if the determination is to reduce the current number of client systems that are active in the project, and the poll response communications include an increase in the current number if the determination is to increase the current number of client systems that are active in the project;*

*repeatedly utilize the poll communications and the poll response communications to coordinate project activities of the client systems during project operations.*

*52. The server system of claim 51, wherein the initial project and poll parameters comprise a poll period setting that determines when the plurality of client systems will poll the server system.*

*53. The server system of claim 52, wherein the poll period settings for the plurality of the client systems are the same.*

*54. The server system of claim 51, wherein the poll communications comprise identification, project status information and current poll period setting information.*

*55. The server system of claim 51, further comprising a poll database configured to store poll related information about each of the plurality of client systems.*

*56. The server system of claim 55, further comprising at least one control server and at least one poll server system, the poll server system being coupled to the poll database and being configured to handle poll operations relating to the plurality of client systems.*

*57. The server system of claim 56, wherein the project comprises a network site testing project.*

*58. The server system of claim 57, wherein the initial project and poll parameters comprises a test start time, a test stop time and poll period information.*

*59. The server system of claim 56, further comprising a control interface configured for coordination of a client system participating in the network site testing project.*

*60. The server system of claim 59, wherein the poll server is configured to provide dynamic snapshot information through the control interface and to receive modifications to the initial project and poll parameters for ongoing project operations.*

*61. The server system of claim 60, wherein the modifications are configured to include modifications to how many client systems are active in the network site testing project.*

*62. The server system of claim 61, wherein the plurality of client systems participating in the project are assigned as active client systems and on-hold client systems, such that the active client systems actively process the project workload and the on-hold client systems form an on-hold pool of client systems that are capable of being added to active participation.*

*63. The server system of claim 51, further comprising an attributes database, the database configured to store attributes of the plurality of client systems.*

*64. The server system of claim 63, further configured to allow selection of the plurality of client systems for project participation based upon identification of desired client system attributes.*

*65. The server system of claim 64, wherein the attributes comprise device capabilities for the plurality of client systems.*

*66. A tangible computer-readable medium having stored thereon computer-executable instructions that, if executed by a server system, cause the server system to perform a method comprising:*

*distributing workloads for at least one project, and initial project and poll parameters, to each of a plurality of client systems, each of the plurality of client systems running a client agent program to provide workload processing for the at least one project;*

*receiving poll communications from the plurality of client systems during processing of project workloads by the plurality of client systems, the poll communications providing at least part of a dynamic snapshot information of current project status;*

*analyzing the poll communications to determine whether or not to make one or more modifications to the initial project and poll parameters, wherein the modifications to the initial project and poll parameters utilize the dynamic snapshot information to determine whether to change how many client systems are active in the at least one project, and if a fewer number is desired, including within a polling response communications a reduction in the number of actively participating clients, and if a greater number is desired, adding client systems to active participation in the at least one project;*

*transmitting the poll response communications to the plurality of client systems to modify the initial project and poll parameters depending upon one or more decisions reached in the analyzing step; and*

*repeating the receiving, analyzing and transmitting steps to dynamically coordinate project activities of the plurality of client systems during project operations.*

* * * * *

UNITED STATES PATENT AND TRADEMARK OFFICE

CERTIFICATE OF CORRECTION

PATENT NO. : RE42,153 E
APPLICATION NO. : 12/462600
DATED : February 15, 2011
INVENTOR(S) : Hubbard et al.

It is certified that error appears in the above-identified patent and that said Letters Patent is hereby corrected as shown below:

Title page, item (56), under "Other Publications", in Column 2, Line 1, delete "Wisdon,"" and insert -- Wisdom," --.

Page 3, item (56), under "Other Publications", in Column 2, Line 33, delete "Projet" and insert -- Project --.

Page 4, item (56), under "Other Publications", in Column 1, Line 27, delete ".asp>on" and insert -- .aspx> on --.

Page 4, item (56), under "Other Publications", in Column 2, Line 11, delete "world" and insert -- World --.

Page 4, item (56), under "Other Publications", in Column 2, Line 22, delete "10/68,210," and insert -- 10/687,210, --.

Page 4, item (56), under "Other Publications", in Column 2, Line 24, delete "09/834785" and insert -- 09/834,785 --.

Page 4, item (56), under "Other Publications", in Column 2, Line 28, delete "final" and insert -- Final --.

Column 1, line 14, delete "abandoned" and insert -- abandoned and --.

Column 29, line 20, in Claim 4, before "the poll" delete "in".

Column 29, line 49, in Claim 11, delete "testing [to]," and insert -- testing, [to] --.

Column 29, line 52, in Claim 12, delete "slop" and insert -- stop --.

Signed and Sealed this
Thirtieth Day of August, 2011

David J. Kappos

David J. Kappos
*Director of the United States Patent and Trademark Office*

Column 29, line 66, in Claim 16, delete "method" and insert -- method of --.

Column 30, lines 2-3, in Claim 16, delete "systems [or]," and insert -- systems, [or] --.

Column 32, line 15, in Claim 36, delete "*where in*" and insert -- *wherein* --.

Column 33, line 1, in Claim 49, delete "*method*" and insert -- *method of* --.

Column 34, line 30, in Claim 66, delete "*tangible*" and insert -- *non-transitory* --.